United States Patent
Genshaft et al.

(10) Patent No.: US 10,452,558 B2
(45) Date of Patent: Oct. 22, 2019

(54) ADDRESS RANGE MAPPING FOR STORAGE DEVICES

(71) Applicant: Western Digital Technologies, Inc, San Jose, CA (US)

(72) Inventors: Igor Genshaft, Bat Yam (IL); Marina Frid, Jerusalem (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/153,561

(22) Filed: Oct. 5, 2018

(65) Prior Publication Data

US 2019/0042464 A1 Feb. 7, 2019

Related U.S. Application Data

(63) Continuation-in-part of application No. 15/640,362, filed on Jun. 30, 2017, now Pat. No. 10,380,015.

(51) Int. Cl.
*G06F 13/00* (2006.01)
*G06F 12/1018* (2016.01)
*G06F 12/109* (2016.01)
*G06F 12/0864* (2016.01)
(Continued)

(52) U.S. Cl.
CPC ...... *G06F 12/1018* (2013.01); *G06F 12/0246* (2013.01); *G06F 12/0864* (2013.01); *G06F 12/0891* (2013.01); *G06F 12/109* (2013.01); *G06F 2212/1016* (2013.01);
(Continued)

(58) Field of Classification Search
None
See application file for complete search history.

(56) References Cited

U.S. PATENT DOCUMENTS

| | | |
|---|---|---|
| 8,489,817 B2 | 7/2013 | Flynn et al. |
| 9,244,833 B2 | 1/2016 | Cheng |
| 10,380,015 B2 | 8/2019 | Genshaft et al. |

(Continued)

OTHER PUBLICATIONS

U.S. Appl. No. 15/640,362, Restriction Requirement dated Jan. 29, 2019.

(Continued)

*Primary Examiner* — Sean D Rossiter
(74) *Attorney, Agent, or Firm* — Kunzler Bean & Adamson, PC

(57) ABSTRACT

Apparatuses, systems, methods, and computer program products are disclosed for address range mapping for memory devices. A system includes a set of non-volatile memory elements accessible using a set of physical addresses and a controller for the set of non-volatile memory elements. A controller is configured to maintain a hierarchical data structure for mapping logical addresses to a set of physical addresses. A hierarchical data structure comprises a plurality of levels with hashed mappings of ranges of logical addresses at range sizes selected based on a relative position of an associated level within the plurality of levels. A controller is configured to receive an I/O request for data of at least one logical address. A controller is configured to satisfy an I/O request using a hashed mapping having a largest available range size to map at least one logical address of the I/O request to one or more physical addresses.

20 Claims, 16 Drawing Sheets

(51) Int. Cl.
 *G06F 12/0891* (2016.01)
 *G06F 12/02* (2006.01)
(52) U.S. Cl.
 CPC ............... *G06F 2212/657* (2013.01); *G06F 2212/7201* (2013.01); *G06F 2212/7207* (2013.01)

(56) References Cited

U.S. PATENT DOCUMENTS

| | | | |
|---|---|---|---|
| 2002/0046216 A1* | 4/2002 | Yamazaki | G06F 3/0607 |
| 2010/0318762 A1* | 12/2010 | Malyugin | G06F 12/1027 711/207 |
| 2013/0339567 A1* | 12/2013 | Carpentier | G06F 11/0709 711/4 |
| 2016/0048354 A1* | 2/2016 | Walsh | G06F 12/0246 711/103 |
| 2017/0161205 A1* | 6/2017 | Leggette | G06F 3/067 |
| 2019/0004941 A1 | 1/2019 | Genshaft et al. | |
| 2019/0057041 A1* | 2/2019 | Ha | G06F 12/1018 |

OTHER PUBLICATIONS

U.S. Appl. No. 15/640,362, Notice of Allowance dated May 28, 2019.

\* cited by examiner

ADDRESS RANGE MAPPING FOR STORAGE DEVICES

CROSS-REFERENCES TO RELATED APPLICATIONS

This application is a continuation-in-part of U.S. patent application Ser. No. 15/640,362 entitled "LOGICAL ADDRESS RANGE MAPPING FOR STORAGE DEVICES" and filed on Jun. 30, 2017 for Igor Genshaft et al., which is incorporated herein by reference.

TECHNICAL FIELD

The present disclosure, in various embodiments, relates to storage operations and more particularly relates to address range mapping for storage devices.

BACKGROUND

Many storage systems and/or devices use logical addresses to securely manage memory so that applications and/or programs do not have direct access to physical memory, to provide wear leveling, or the like. The logical addresses are typically mapped to physical addresses so that a processor can access the physical addresses to perform input/output (I/O) operations on the data stored therein. In some implementations, the mappings of the logical address to physical address for the memory may be stored in a master layer.

In further implementations, a storage system may include an update layer that maintains a record of changes in the mappings of the logical addresses to the physical addresses. Periodically, the changes in the update layer are made in the master layer. To facilitate the storing of the mappings of the logical addresses to the physical addresses, the storage system may calculate hashed mappings based on the beginning logical block address for data, the length of the data, and the physical block address associated with the logical block address. The storage system may then save the hashed mapping in the update layer.

SUMMARY

Systems are presented for address range mapping for storage devices. In one embodiment, a set of non-volatile memory elements is accessible using a set of physical addresses. A controller for a set of non-volatile memory elements, in certain embodiments, is configured to maintain a hierarchical data structure for mapping logical addresses to a set of physical addresses. A hierarchical data structure, in some embodiments, comprises a plurality of levels with hashed mappings of ranges of logical addresses at range sizes selected based on a relative position of an associated level within the plurality of levels. A controller, in a further embodiment, is configured to receive an input/output (I/O) request for data of at least one logical address. A controller, in one embodiment, is configured to satisfy an I/O request using a hashed mapping having a largest available range size to map at least one logical address of the I/O request to one or more physical addresses.

Apparatuses are presented for address range mapping for storage devices. In one embodiment, an apparatus includes means maintaining a hierarchical data structure comprising a plurality of levels for mapping logical addresses to physical addresses of a non-volatile memory. Each level of a plurality of levels, in certain embodiments, comprise a hash table with entries comprising physical addresses. Different levels of a plurality of levels, in some embodiments, are associated with different sized ranges of logical addresses. An apparatus, in a further embodiment, includes means for hashing an index determined based on a logical address of an I/O request and a different sized range for a level of a plurality of levels to check the level for an entry associated with the logical address.

Also presented are methods for address range mapping for storage devices. A method, in one embodiment, includes determining an index for a logical address of an I/O request in a first level of a hierarchical address mapping structure based on the logical address and a range size for the first level of the hierarchical address mapping structure. A method, in a further embodiment, includes checking a first level for a physical address associated with an index. In certain embodiments, a method includes determining a different index for a logical address in a different level of a hierarchical address mapping structure in response to a first level comprising no physical address associated with an index. A method, in one embodiment, includes executing an I/O request using a physical address associated with a different index in a different level.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
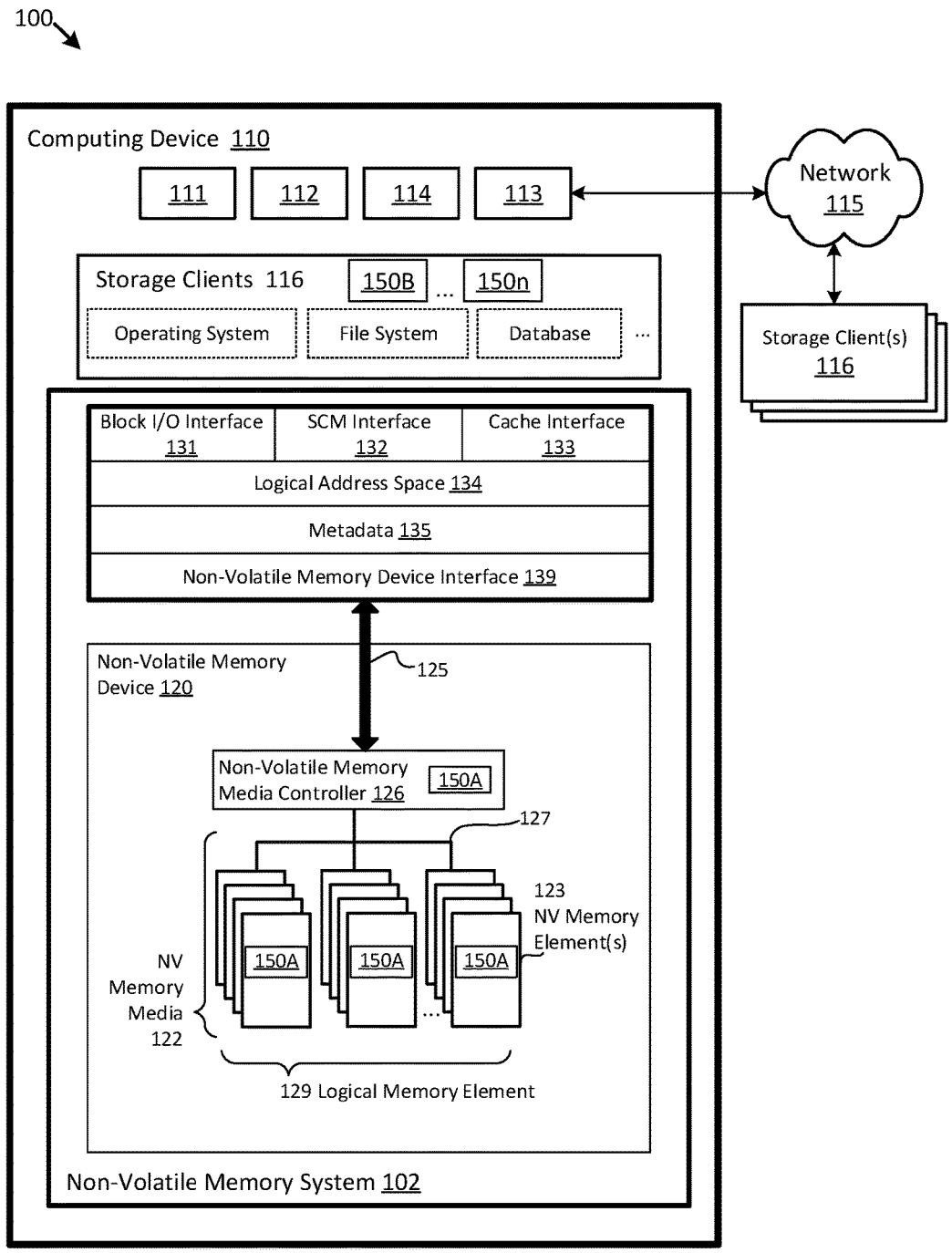
FIG. 1A is a schematic block diagram illustrating one embodiment of a system for logical address range mapping for storage devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" may mean "one or more," unless expressly specified otherwise. The term "sets" may mean multiples of or a plurality of "one or mores," "ones or more," and/or "ones or mores" consistent with set theory, unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, may be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 comprising a set of hierarchical data structures 150A, 150B, . . . 150n (also simply referred to individually, in various groups, or collectively, as hierarchical data structure(s) 150) mapping logical address ranges to physical address ranges for a non-volatile memory device 120. Each hierarchical data structure 150 may represent a level or layer in a hierarchical order. Each hierarchical data structure 150 may include mappings between logical addresses and physical addresses for the non-volatile memory device 120 described below.

The hierarchical data structure 150 may be part of and/or in communication with a non-volatile memory media controller 126, a non-volatile memory element 123, a device driver, or the like. The hierarchical data structure 150 may function on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer-readable storage medium 114. The computer-readable storage medium 114 may comprise executable instructions configured to cause the computing device 110 (e.g., processor 111) to perform steps of one or more of the methods disclosed herein. Alternatively, or in addition, the hierarchical data structure 150 may be embodied as one or more computer-readable instructions stored on the non-transitory storage medium 114.

The non-volatile memory system 120, in the depicted embodiment, includes the hierarchical data structure 150A. The hierarchical data structure 150A or level, in various embodiments, may provide mappings between individual logical addresses and physical addresses for the non-volatile memory device 120 at a lowest level, as discussed elsewhere herein. The hierarchical data structure(s) 150B, . . . 150n or level(s), in some embodiments, map ranges of logical addresses to ranges of physical addresses at one or more higher levels in the hierarchical order, as discussed elsewhere herein. The hierarchical data structure(s) 150 allow the physical address/addresses of data stored in the non-volatile memory device 120 to be located more efficiently than at least some conventional location techniques.

In one embodiment, the hierarchical data structure 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the hierarchical data structure 150 may comprise executable software code, such as a device driver or the like, stored on the computer-readable storage medium 114 for execution on the processor 111. In a further embodiment, the hierarchical data structure 150 may include a combination of both executable software code and logic hardware.

In one embodiment, a device driver or other executable application, via a bus 125 or the like, may utilize the hierarchical data structure 150 to lookup and/or locate one or more physical addresses corresponding to the mapped logical address ranges in the hierarchical data structure 150. Further, a device driver and/or one or more storage clients 116 (also simply referred to individually, in various groups, or collectively, as storage client(s) 116), via the bus 125, may lookup and/or locate one or more physical addresses corresponding to the mapped logical address/addresses in the hierarchical data structure(s) 150B, . . . 150n. Accordingly, the hierarchical data structure 150, in some embodiments, may comprise and/or be in communication with one or more direct memory access (DMA) modules, remote DMA modules, bus controllers, bridges, buffers, and so on to facilitate locating physical addresses.

According to various embodiments, a non-volatile memory controller 126 in communication with the hierarchical data structure 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address may refer to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139. In some embodiments, the non-volatile memory device interface 139 is configured to transfer data, commands, and/or queries to the non-volatile memory media controller 126 over a bus 125, as described above.

Figure 1B:
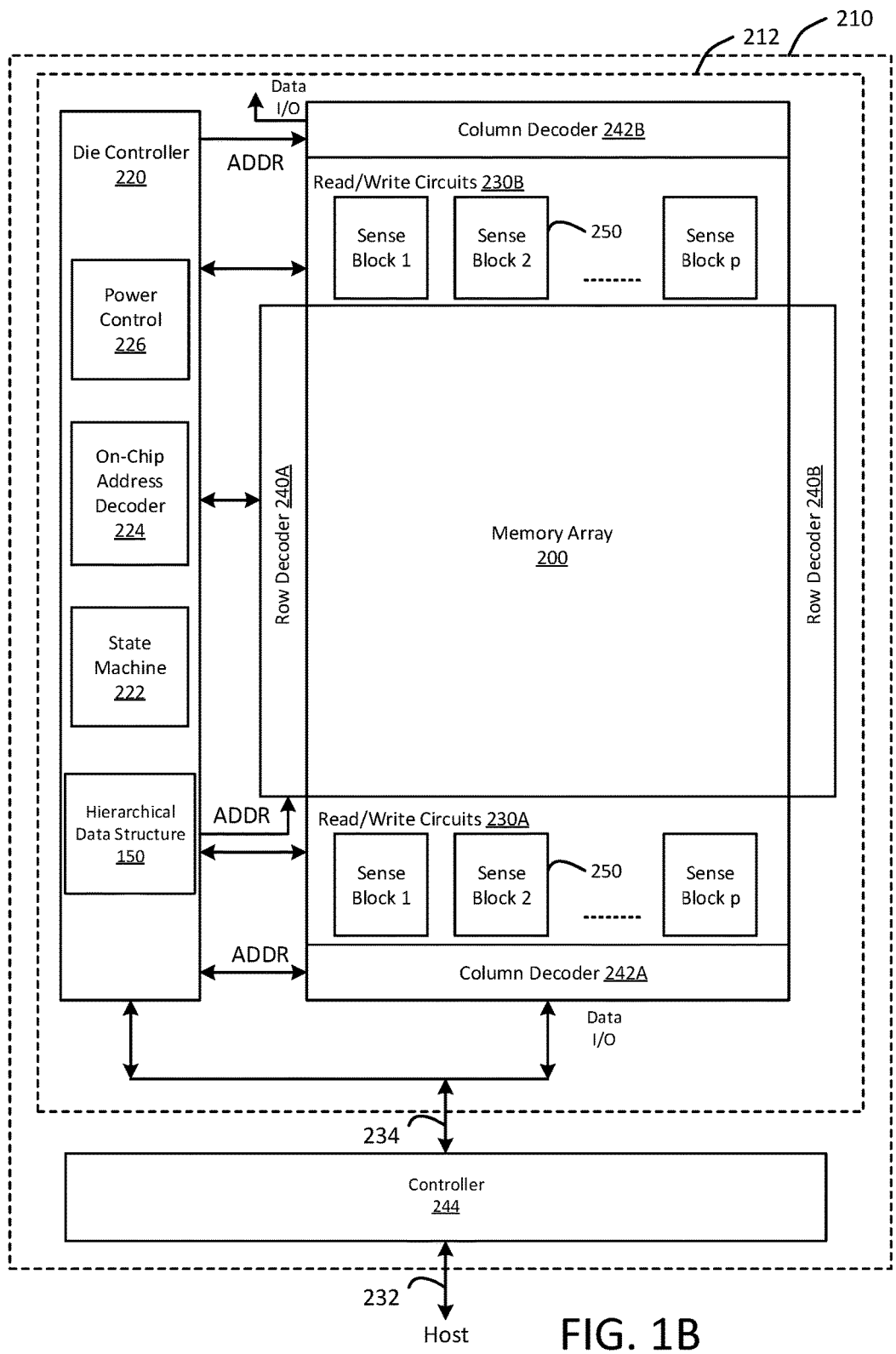
FIG. 1B is a schematic block diagram illustrating another embodiment of a system for logical address range mapping for storage devices.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation may include multiple chips 212.

Die controller 220, in one embodiment, cooperates with the read/write circuits 230A/230B to perform memory operations on the memory array 200. The die controller 220, in certain embodiments, includes a hierarchical data structure 150, a state machine 222, and an on-chip address decoder 224. In one embodiment, the state machine 222 comprises the hierarchical data structure 150. In a further embodiment, the controller 244 comprises the hierarchical data structure 150 and/or the bitmap 155. In various embodiments, one or more of the sense blocks 250 comprise the hierarchical data structure 150.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. In certain embodiments, the state machine 222 includes an embodiment of the hierarchical data structure 150.

The hierarchical data structure 150, in certain embodiments, is/are embodied as software in a device driver, hardware in a device controller 244, and/or hardware in a die controller 220 and/or state machine 222. In one embodiment, one or any combination of die controller 220, decoder circuit 224, state machine circuit 222, decoder circuit 242A, decoder circuit 242B, decoder circuit 240A, decoder circuit 240B, read/write circuits 230A, read/write circuits 230B, and/or controller 244 may be referred to as one or more managing circuits for the hierarchical data structure 150.

Figure 2:
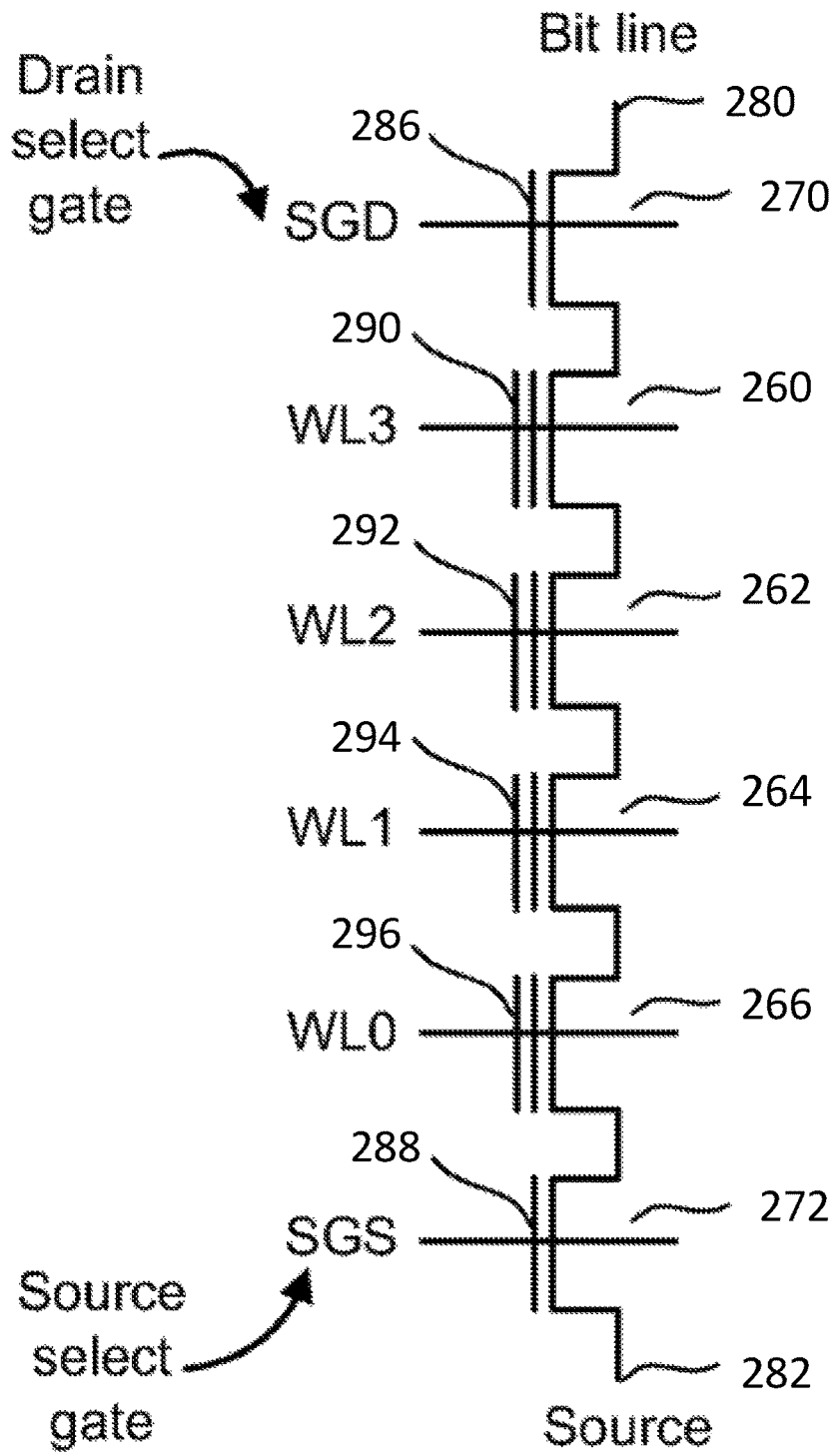
FIG. 2 is a schematic block diagram illustrating one embodiment of a string of storage cells.

FIG. 2 depicts one embodiment of a NAND string comprising a plurality of storage elements. The NAND string depicted in FIG. 2, in some embodiments, includes four transistors 260, 262, 264, 266 connected in series and located between a first select transistor 270 and a second select transistor 272. In some embodiments, a transistor 260, 262, 264, 266 includes a control gate and a floating gate. A control gate 290, 292, 294, 296, in one embodiment, is connected to, or comprises a portion of, a word line. In a further embodiment, a transistor 260, 262, 264, 266 is a storage element, storage cell, or the like, also referred to as a memory cell. In some embodiments, a storage element may include multiple transistors 260, 262, 264, 266.

The first select transistor 270, in some embodiments, gates/connects the NAND string connection to a bit line 280 via a drain select gate SGD. The second select transistor 272, in certain embodiments, gates/connects the NAND string connection to a source line 282 via a source select gate SGS. The first select transistor 270, in a further embodiment, is controlled by applying a voltage to a corresponding select gate 286. The second select transistor 272, in some embodiments, is controlled by applying a voltage to corresponding select gate 288.

As shown in FIG. 2, the source line 282, in one embodiment, is connected to the sources of each transistor/storage cell 260, 262, 264, 266 in the NAND string. The NAND string, in some embodiments, may include some storage elements 260, 262, 264, 266 that have been programmed and some storage elements 260, 262, 264, 266 that have not been programmed. As described in more detail below, the hierarchical data structure 150 controls whether temperature compensation applied to a storage device, such as a NAND string, uses a fixed temperature or a current temperature.

Figure 3:
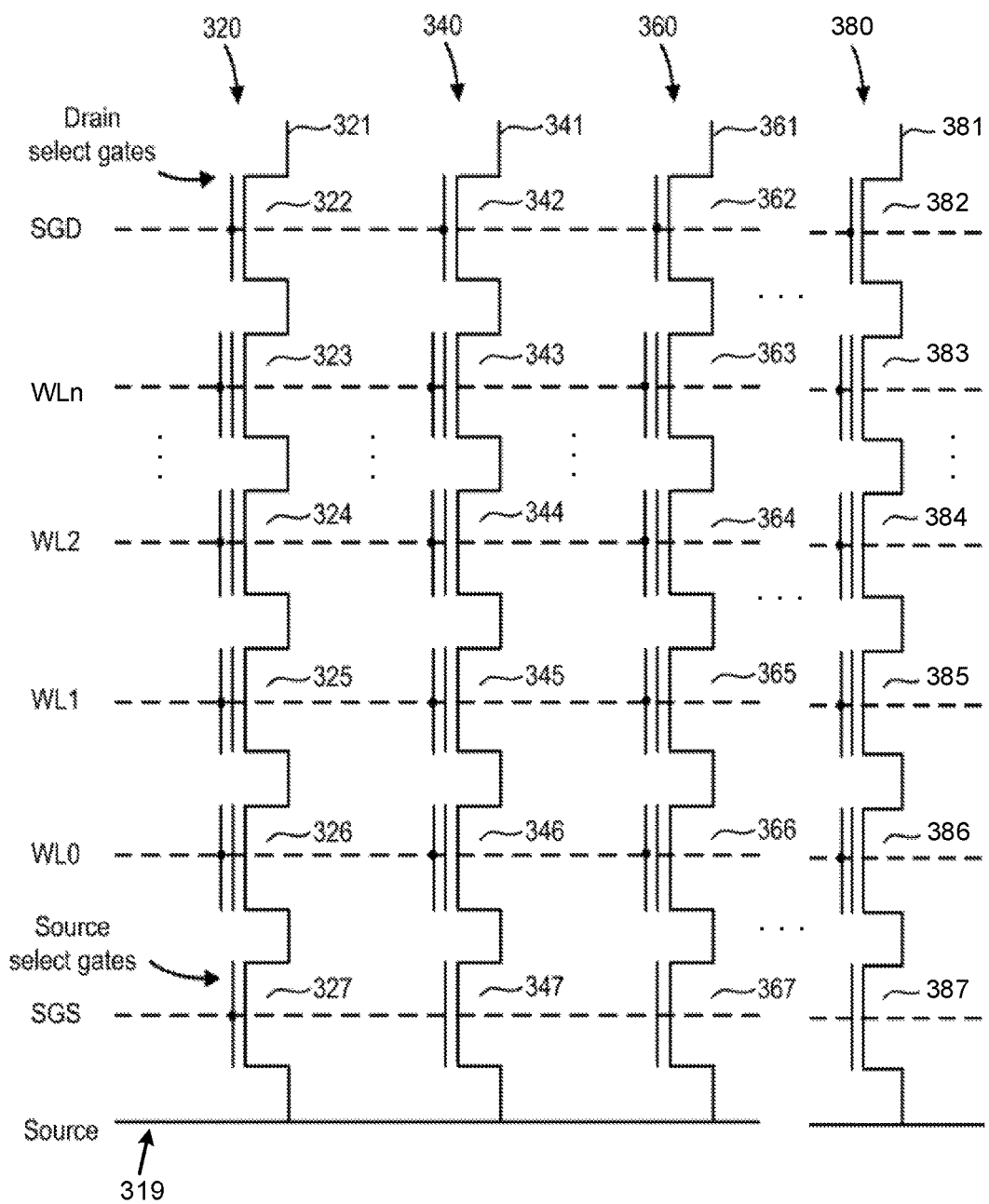
FIG. 3 is a schematic block diagram illustrating one embodiment of an array of storage cells.

FIG. 3 is a circuit diagram depicting a plurality of NAND strings 320, 340, 360, 380. An architecture for a flash memory system using a NAND structure may include several NAND strings 320, 340, 360, 380. For example, FIG. 3 illustrates NAND strings 320, 340, 360, 380 in a memory array 200 that includes multiple NAND strings 320, 340, 360, 380. In the depicted embodiment, each NAND string 320, 340, 360, 380 includes drain select transistors 322, 342, 362, 382, source select transistors 327, 347, 367, 387, and storage elements 323-326, 343-346, 363-366, 383-386. While four storage elements 323-326, 343-346, 363-366, 383-386 per NAND string 320, 340, 360, 380 are illustrated for simplicity, some NAND strings 320, 340, 360, 380 may include any number of storage elements, e.g., thirty-two, sixty-four, or the like storage elements.

NAND strings 320, 340, 360, 380, in one embodiment, are connected to a source line 319 by source select transistors 327, 347, 367, 387. A selection line SGS may be used to control the source side select transistors. The various NAND strings 320, 340, 360, 380, in one embodiment, are connected to bit lines 321, 341, 361, 381 by drain select transistors 322, 342, 362, 382. The drain select transistors 322, 342, 362, 382 may be controlled by a drain select line SGD. In some embodiments, the select lines do not necessarily need to be in common among the NAND strings 320, 340, 360, 380; that is, different select lines may be provided for different NAND strings 320, 340, 360, 380.

As described above, each word line WL0-WLn comprises one or more storage elements 323-383, 324-384, 325-385, 326-386. In the depicted embodiment, each bit line 321, 341, 361, 381 and the respective NAND string 320, 340, 360, 380 comprise the columns of the memory array 200, storage block, erase block, or the like. The word lines WL0-WLn, in some embodiments, comprise the rows of the memory array 200, storage block, erase block, or the like. Each word line WL0-WLn, in some embodiments, connects the control gates of each storage element 323-383, 324-384, 325-385, 326-386 in a row. Alternatively, the control gates may be provided by the word lines WL0-WLn themselves. In some embodiments, a word line WL0-WLn may include tens, hundreds, thousands, millions, or the like of storage elements 323-383, 324-384, 325-385, 326-386.

In one embodiment, each storage element 323-326, 343-346, 363-366, 383-386 is configured to store data. For example, when storing one bit of digital data, the range of possible threshold voltages ("VTH") of each storage element 323-326, 343-346, 363-366, 383-386 may be divided into two ranges which are assigned logical data "1" and "0." In one example of a NAND type flash memory, the VTH may be negative after the storage elements 323-326, 343-346, 363-366, 383-386 are erased, and defined as logic "1." In one embodiment, the VTH after a program operation is positive and defined as logic "0."

When the VTH is negative and a read is attempted, in some embodiments, storage elements 323-326, 343-346, 363-366, 383-386 will turn on to indicate logic "1" is being stored. When the VTH is positive and a read operation is attempted, in a further embodiment, a storage element will not turn on, which indicates that logic "0" is stored. Each storage element 323-383, 324-384, 325-385, 326-386 may also store multiple levels of information, for example, multiple bits of digital data. In such an embodiment, the range of VTH value is divided into the number of levels of data. For example, if four levels of information may be stored in each storage element 323-326, 343-346, 363-366, 383-386, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage elements 323-326, 343-346, 363-366, 383-386 and the threshold voltage ranges of the storage elements 323-326, 343-346, 363-366, 383-386 depends upon the data encoding scheme adopted for the storage elements 323-326, 343-346, 363-366, 383-386.

In some embodiments, temperature compensation used for sensing data on the storage elements 323-326, 343-346, 363-366, 383-386 may be noisy resulting in reduced sensing accuracy. In such an embodiment, the hierarchical data structure 150 may selectively hold temperature compensation used for sensing data on the storage elements 323-326, 343-346, 363-366, 383-386 based on a command indicating to hold the temperature compensation.

Figure 4:
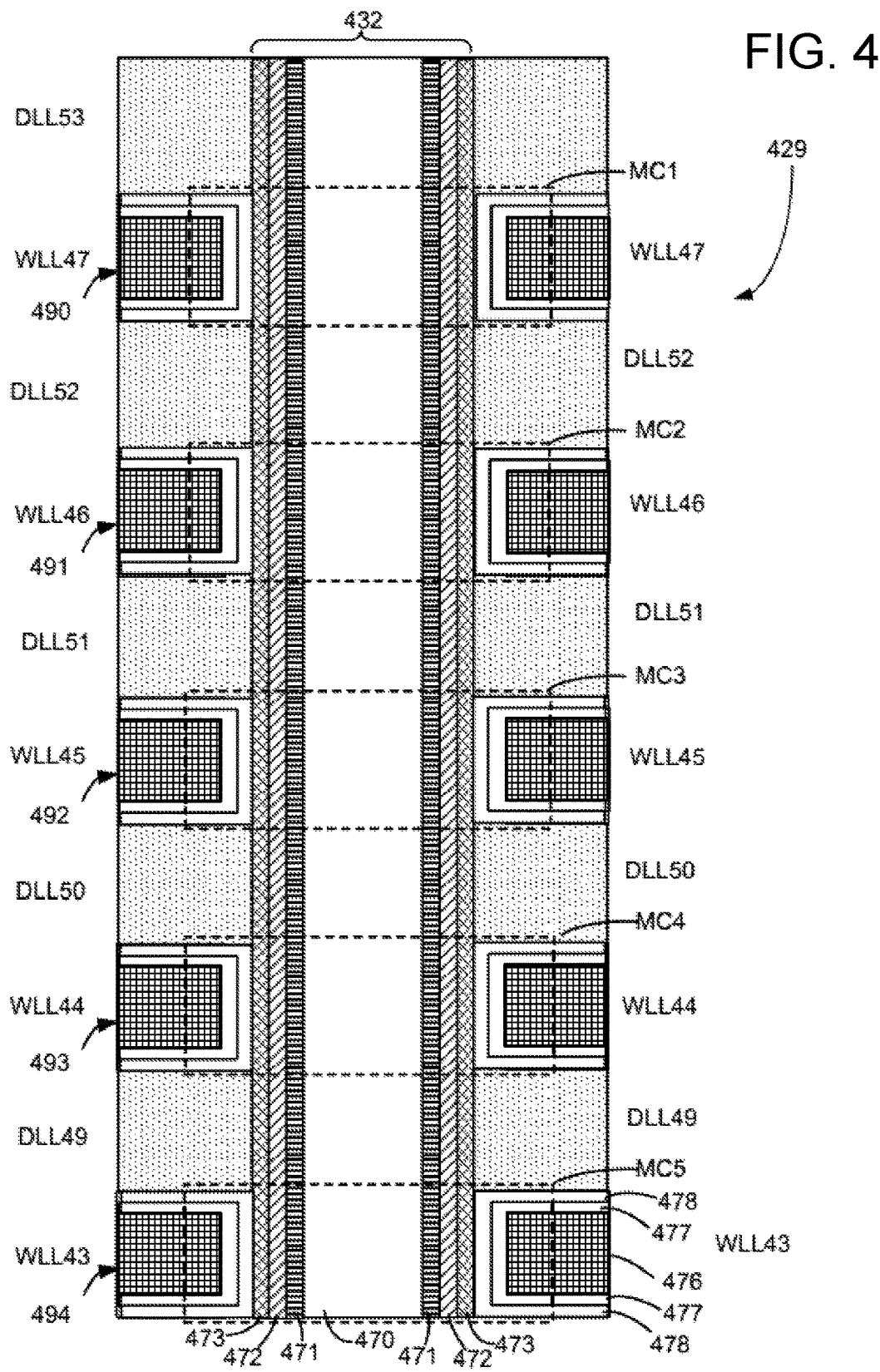
FIG. 4 illustrates one embodiment of a 3D, vertical NAND flash memory structure.

FIG. 4 illustrates one embodiment of a cross-sectional view of a 3D, vertical NAND flash memory structure 429 or string 429. In one embodiment, the vertical column 432 is round and includes four layers; however, in other embodiments more or less than four layers may be included and other shapes may be used (e.g., a "U" shape instead of an "I" shape or the like). In one embodiment, a vertical column 432 includes an inner core layer 470 that is made of a dielectric, such as SiO2. Other materials may also be used. Surrounding inner core 470 is polysilicon channel 471. Materials other than polysilicon may also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is a shared charge trapping layer 473, such as (for example) Silicon Nitride. Other materials and structures may also be used. The technology described herein is not limited to any particular material or structure.

FIG. 4 depicts dielectric layers DLL49, DLL50, DLL51, DLL52 and DLL53, as well as word line layers WLL43, WLL44, WLL45, WLL46, and WLL47. Each of the word line layers includes a word line region 476 surrounded by an aluminum oxide layer 477, which is surrounded by a blocking oxide (SiO2) layer 478. The physical interaction of the word line layers with the vertical column forms the memory cells. Thus, a memory cell, in one embodiment, comprises channel 471, tunneling dielectric 472, charge trapping layer 473 (e.g., shared with other memory cells), blocking oxide layer 478, aluminum oxide layer 477 and word line region 476. In some embodiments, the blocking oxide layer 478 and aluminum oxide layer 477, may be replaced by a single layer of material with insulating properties or by more than 2 layers of different material with insulating properties. Furthermore, the materials used are not limited to silicon dioxide (SiO2) or aluminum oxide. For example, word line layer WLL47 and a portion of vertical column 432 comprise a memory cell MC1. Word line layer WLL46 and a portion of vertical column 432 comprise a memory cell MC2. Word line layer WLL45 and a portion of vertical column 432 comprise a memory cell MC3. Word line layer WLL44 and a portion of vertical column 432 comprise a memory cell MC4. Word line layer WLL43 and a portion of vertical column 432 comprise a memory cell MC5. In other architectures, a memory cell may have a different structure; however, the memory cell would still be the storage unit.

When a memory cell is programmed, electrons are stored in a portion of the charge trapping layer 473 which is associated with the memory cell. These electrons are drawn into the charge trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Storage cells in the same location or position in different memory structures 429 (e.g., different NAND strings 429) on different bit lines, in certain embodiments, may be on the same word line. Each word line may store one page of data, such as when 1-bit of data is stored per cell (SLC); two pages of data, such as when 2-bits of data are stored per cell (MLC); three pages of data, such as when 3-bits of data are stored per cell (TLC); four pages of data, such as when 4-bits of data are stored per cell (QLC); or another number of pages of data.

In the depicted embodiment, a vertical, 3D NAND flash memory structure 429 comprises an "I" shaped memory structure 429. In other embodiments, a vertical, 3D NAND flash memory structure 429 may comprise a "U" shaped structure, or may have another vertical and/or stacked architecture. In certain embodiments, four sets of strings 429 (e.g., four sets of 48 word lines, or another predefined number of word lines) may form an erase block, while in other embodiments, fewer or more than four sets of strings 429 may form an erase block. As may be appreciated, any suitable number of storage cells may be part of a single string 429. In one embodiment, a single string 429 includes 48 storage cells.

Figure 5:
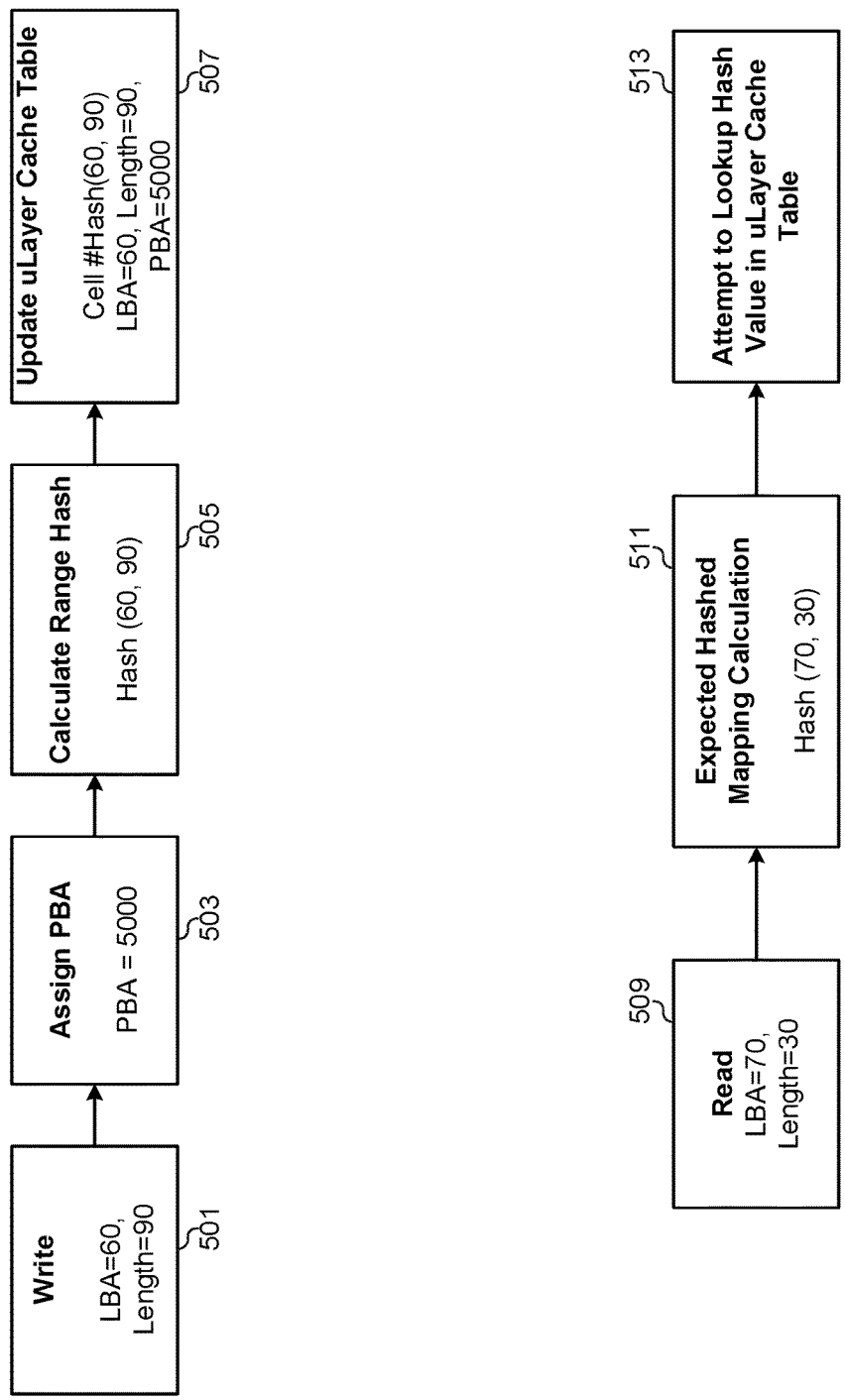
FIG. 5 is a flow chart diagram illustrating one embodiment of saving and reading a hashed mapping.

FIG. 5 illustrates a flow diagram for handling I/O requests from the update layer by the computing device 110. As used herein, an I/O request may refer to a request that provides data to or requests data from a memory device, where data is information to be stored on the non-volatile memory. In certain embodiments, the computing device 110 may handle I/O requests in part by maintaining an update layer and a master layer. The master layer and the update layer may both maintain a record of mappings of logical addresses to physical addresses of the non-volatile memory device 120. As used herein, a physical address may refer to the address of one or more cells of a non-volatile memory element and/or one or more bits and/or bytes of data stored thereby. In particular, the master layer may maintain a record mapping logical addresses to physical addresses for a portion of or an entire non-volatile memory device 120. The update layer may maintain a record of changes to be made to the mappings stored in the master layer. Accordingly, the update layer may be smaller than the master layer such that the update layer may be stored in the main memory of the computing device 110. Thus, data that is frequently accessed may have an associated mapping in the update layer and the mapping of the logical address to the physical address of the data may be more quickly acquired by identifying the mapping in the update layer.

In certain embodiments, when mappings are stored in the update layer, the mappings may be stored as hashed mappings. As used herein, a hashed mapping may refer to a mapping of a logical address to a physical address, where information describing the mapping is hashed using a hash function (e.g., a hash of a logical address, a hash of an index associated with a logical address and/or a range of logical addresses, or the like). To store a hashed mapping in the update layer, the computing device 110 may write data to memory as shown at 501. To save the mapping within the update layer the computing device 110 may acquire the logical address of the data and the length of the data being saved. For example, the computing device 110 may acquire the logical address of 60 and the length or range size of the data to be acquired of 90. As used herein, the range size of the data may refer to the difference between the smallest logical address associated with a set of data and the largest logical address associated with a set of data and the range of the data may refer to the logical addresses associated with the data. At 503, the computing device 110 may assign a physical address, such as a PBA, to the logical address. For example, the computing device 110 may assign the physical address of 5000 to the logical address of 60. When the physical address is assigned to the logical address, the computing device 110 may, at 505, calculate a hashed mapping for the logical address based on the range size of the data, the logical address, an index for the logical address determined for a level selected based on the range size, or the like, and the result may be mapped to the physical address stored in the selected level. In the example above, the computing device 110 may calculate a hashed mapping by selecting a level for the mapping based on a range size of 90 and may determine an index based on the logical address of 60, and may perform a hash function on the determined index, storing the physical address in the selected level in association with the result of the hash function, or the like (e.g., a hashed mapping). When the hashed mapping is calculated, the computing device 110 may, at 507, add the information to the update layer hash table with the hashed mapping being associated with the physical address.

When a logical address is mapped to a physical address within the update layer, the computing device 110 may attempt to look up physical addresses based on logical addresses. To acquire the physical address of the data, the computing device 110 may, at 509, acquire the logical address of the data to be read and the length or range size of the data to be read. For example, the computing device 110 may acquire the logical address of 70 and the range size of 30 corresponding to the range of the logical addresses 70-99 (e.g., from an I/O request such as a read request, a write request, or the like). When the computing device 110 acquires the logical address and the range size of the data, the computing device 110 may calculate an expected hashed mapping at 511. For example, the computing device 110 may calculate the expected hashed mapping using the logical address of 70 and the range size of 30. When the hashed mapping is calculated, the computing device 110 may attempt to lookup the hash value in the update layer hash table at 513. When the computing device 110 finds the hash value in the update layer hash table, the computing device 110 may acquire the physical address for the data.

However, even though a starting logical address of a range of logical addresses may be represented in a level of the update layer, the computing device 110 may fail in the attempt to lookup the hash value associated with another logical address in the range. For example, looking up the logical address of 70 and a range size of 30 may result in a different hash value than a hash for a logical address of 60 and a range size of 90, and may not match each other. In order to use a hash function for ranges of logical addresses, in certain embodiments, one or more levels of a hierarchical data structure 150 may be divided into slots, bins, or other ranges of one or more different range sizes, each associated with an index or other identifier. For any logical address within a particular slot, bin, or other range of logical addresses, the computing device 110 may perform a hash function on the index for the logical address, rather than the logical address itself, so that each logical address in the range of logical addresses will be hashed to the same logical to physical mapping.

Figure 6:
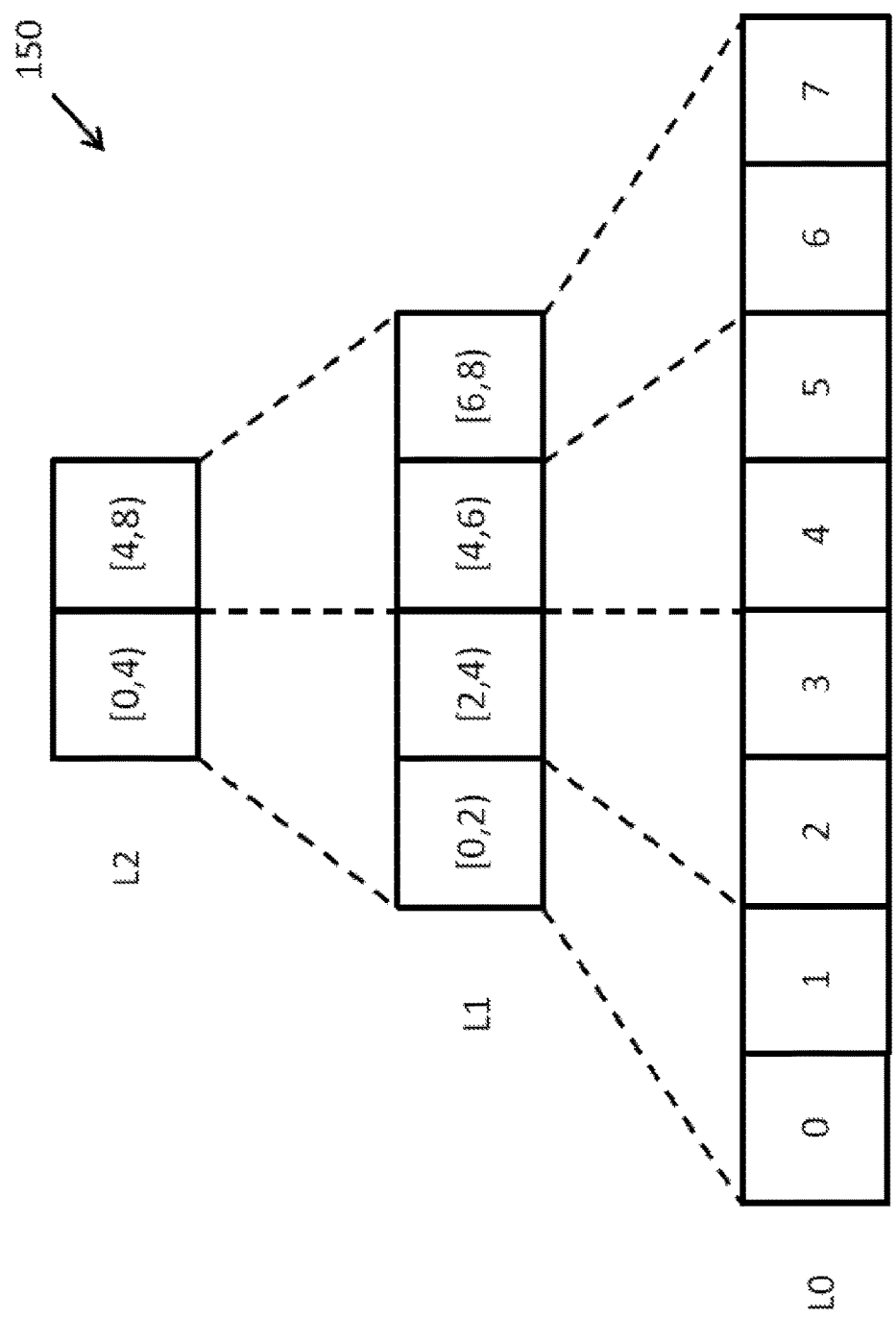
FIG. 6 is a schematic block diagram illustrating one embodiment of a hierarchical data structure.

FIG. 6 depicts one embodiment of a hierarchical data structure 150. The hierarchical data structure 150 may include any quantity of levels that may allow and/or facilitate locating one or more physical addresses in the non-volatile memory 120. At least in the illustrated embodiment, the overall hierarchical data structure 150 includes three (3) levels (e.g., L0-L2), which may represent the hierarchical data structure 150A (e.g., L0), hierarchical data structure 150B (e.g., L1), and hierarchical data structure 150n (e.g., L2).

In general, the hierarchical data structure 150 may map a set of logical addresses to a corresponding set of physical addresses. As shown, the hierarchical data structure 150 maps eight (8) logical addresses to eight (8) corresponding physical addresses, although other quantities are possible and contemplated herein.

With reference to level L1 in the depicted embodiment, level L1 includes four (4) logical address ranges (e.g., [0,2), [2,4), [4,6), and [6,8)). The levels that are adjacent to level L1 include eight (8) ranges of logical addresses (e.g., level L0) and two (2) ranges of logical addresses (e.g., level L2). For instance, level L0 includes eight (8) individual physical address and level L2 includes two (2) ranges of logical addresses (e.g., [0,4) and [4,8)), among other quantities and/or ranges that are possible and contemplated herein.

At least in the illustrated embodiment, the hierarchy increases from the base level (e.g., L0) to a top level (e.g., L2). The notation used herein to denote a range includes [n,m), in which a bracket indicates that the numeral is included in the range and a parenthetical indicates that the numeral is excluded from the range. For instance, the range represented by [4,8) includes the numerals 4-7, but excludes the numeral eight (8), for a quantity/range size of four (4) logical addresses.

As further illustrated, each level includes the total logical address range of the level below it. For instance, level L1 includes the logical address ranges [0,2), [2,4), [4,6), and [6,8), which includes the range of logical addresses 0-7, which is the entire logical address range of level 0 scaled by a factor of two (2). Specifically, the level L1 block with logical addresses [0,2) corresponds to the blocks with logical addresses 0 and 1 at level L0, the level L1 block with logical addresses [2,4) corresponds to the blocks with logical addresses 2 and 3 at level L0, the level L1 block with logical addresses [4,6) corresponds to the blocks with logical addresses 4 and 5 at level L0, and the level L1 block with logical addresses [6,8) corresponds to the blocks with logical addresses 6 and 7 at level L1.

Similarly, level L2 includes the logical address ranges [0,4) and [4,8), which also includes the logical address ranges [0,2), [2,4), [4,6), and [6,8) (and the range of logical addresses 0-7), which is the entire range of level L1 scaled by a factor of two (2) (and level 0 scaled by a factor of four (4)). Specifically, the level L2 block with logical addresses [0,4) corresponds to the blocks with logical address ranges [0,2) and [2,4) in level L1 and the level L2 block with logical addresses [0,4) corresponds to the blocks with logical address ranges [0,2) and [2,4) in level L1.

In some embodiments, each level of the hierarchical data structure 150 includes a scaling factor with respect to the level(s) that are above and/or below it, although other scaling factors are possible and contemplated herein. The scaling factor may be represented as $F[k]$ and may be any positive integer greater than one (1) (e.g., $F[k]>1$). In some embodiments, the scaling factor may be a power of two (2), which may be represented as $2^j$, for some j greater than 1. A scaling factor $F[k]>1$ may ensure that $L=O(\log(N))$, where N is the number of levels in the hierarchical data structure 150.

In certain embodiments, to maintain the similar range sizes of each level of the hierarchical data structure 150 and/or the scaling factor, but to avoid spreading or splitting an unaligned range of logical addresses between different levels, an entry for a logical address range that is larger than and/or not aligned with a range size of a certain level may remain at that level, but may include an indicator, parameter, or the like indicating a length of a tail that exceeds the block size. For example, instead of breaking a range of logical addresses [1,7) into two levels (e.g., including entries of [2,4) and [4,6) on a higher level and entries of [1,2) and [6,7) on a lower level), entries for the range may be included in the higher level and not the lower level, with indicators of the length of a tail that exceeds the range size (e.g., an entry of [2,4) in the higher level with an indicator of a "+1" tail to the left and an entry of [4,6) with an indicator of a "+1" tail to the right, making the entries equivalent to [1,4) and [4,7), or the like).

Each block in the hierarchical data structure 150 includes a reference to and/or points to the corresponding physical address or range of physical addresses included therein. For instance, logical address 4 in level L0 references/points to one (1) corresponding physical address, the logical address range [0,2) in level L1 references/points to two (2) corresponding physical addresses, and the logical address range [4,8) in level 2 references/points to four (4) corresponding physical addresses. Stated differently, level L0 (the lowest level) represents ranges including a length of one (1) shown as individual numbers from 0 to N−1, while level(s) k>0 represents ranges of logical addresses with lengths and alignments that are equal to the corresponding value of the previous level k−1 multiplied by F[k−1].

In various embodiments, the physical addresses that correspond to the logical addresses in the hierarchical data structure 150 are physically adjacent to one another. Further, logical addresses that reference and/or point to physical addresses that store continuous and/or related data may be grouped to form a range of logical addresses at a high level, as discussed elsewhere herein.

As continuous and/or related data may be stored in adjacent physical addresses, mapping a range of logical addresses that correspond to a range of adjacent physical addresses storing the continuous and/or related data may reduce the amount of time it takes to locate a logical address, which may improve the efficiency of the system 100 compared to conventional systems. For instance, locating a logical address in level L2 takes less time and/or is more efficient than locating the logical address in levels L1 and L0. Likewise, locating a logical address in level L1 takes less time and/or is more efficient than locating the logical address in level L0.

Similarly, in certain embodiments, mapping a range of logical addresses that correspond to a range of adjacent physical addresses storing the continuous and/or related data may reduce the storage capacity used to store a level and/or mapping, so that more mappings and/or levels of the hierarchical data structure 150 may be cached in volatile memory than would be possible without compressed, range mappings, allowing the mappings and/or levels cached in volatile memory to be accessed more quickly than if they were stored in non-volatile memory. Mapping a range of logical addresses that correspond to a range of adjacent physical addresses storing the continuous and/or related data, in a further embodiment, may reduce the amount of time used to traverse the hierarchical data structure 150 to locate a mapping, when compared to mappings of individual addresses.

In various embodiments, the lowest level (e.g., level L0) of the hierarchical data structure 150 may be stored in the non-volatile memory 120 and/or in the storage client(s) 116 and the remaining levels (e.g., levels higher than the based level) may be stored in the non-volatile memory 120 and/or in the storage client(s) 116. In one embodiment, the lowest level (e.g., level L0) of the hierarchical data structure 150 is stored in the non-volatile memory 120, although other configurations are possible and contemplated herein.

Figure 7:
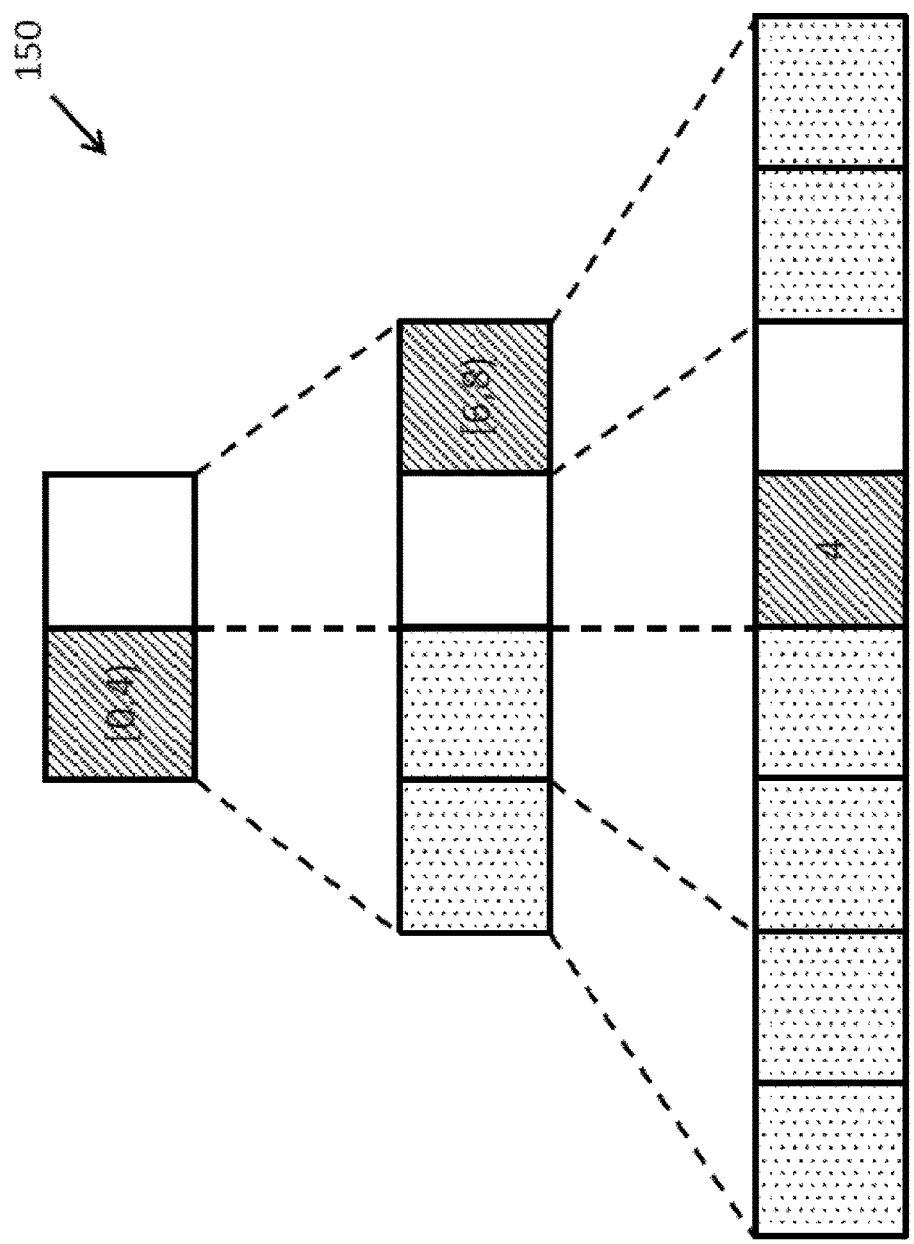
FIG. 7 is a schematic block diagram illustrating one example of the hierarchical data structure at an initial time T0.
Figure 8:
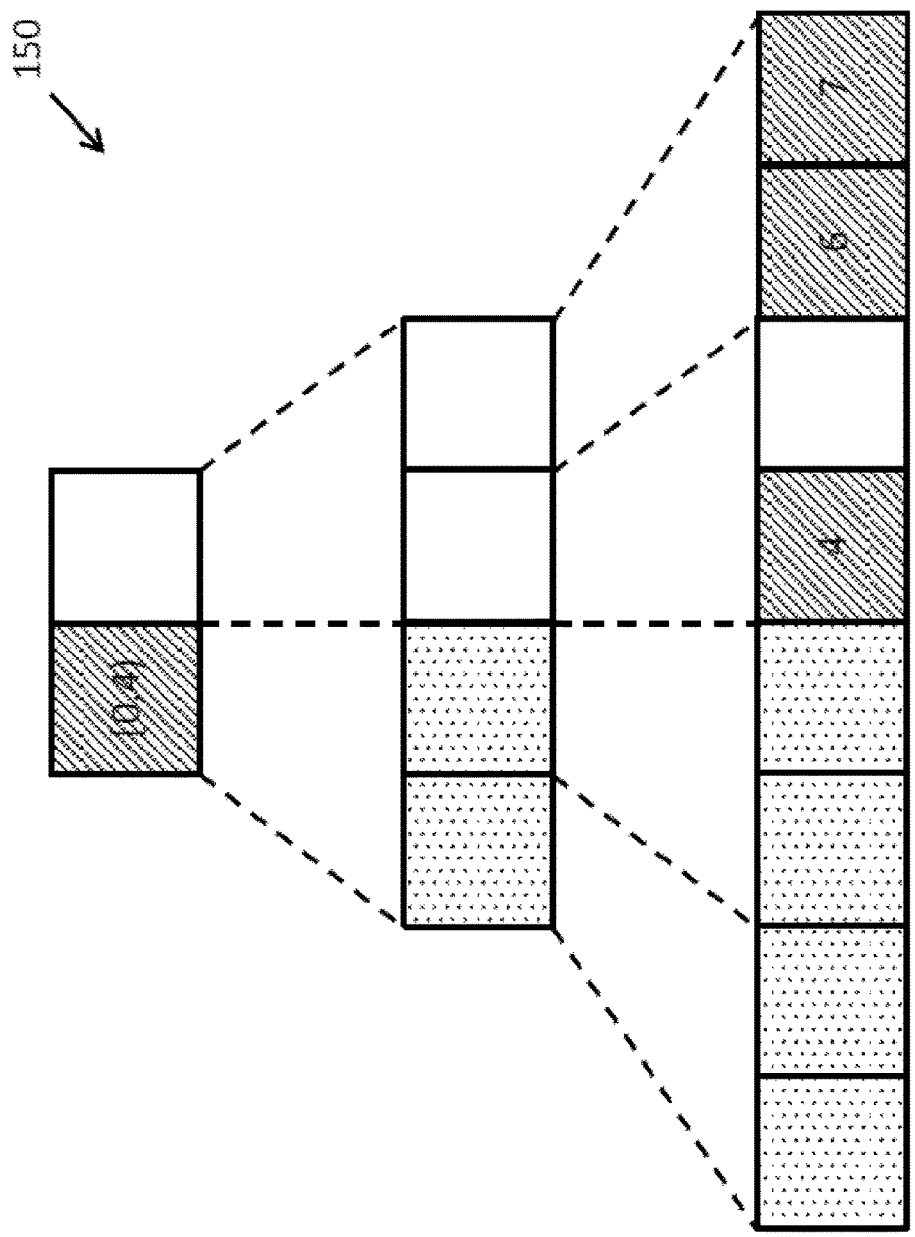
FIG. 8 is a schematic block diagram illustrating one example of the hierarchical data structure at a time T1.
Figure 9:
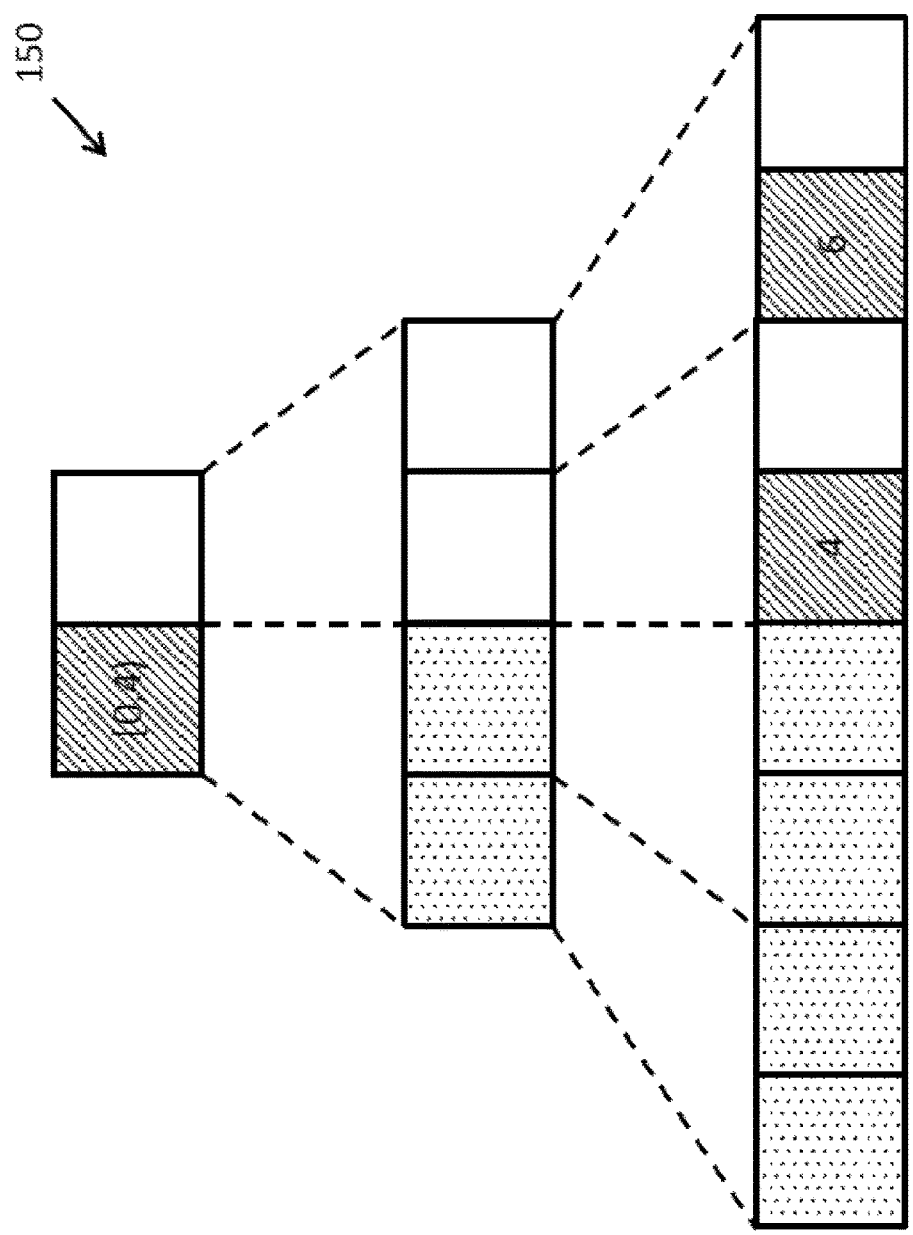
FIG. 9 is a schematic block diagram illustrating another example of the hierarchical data structure at a time T1.
Figure 10:
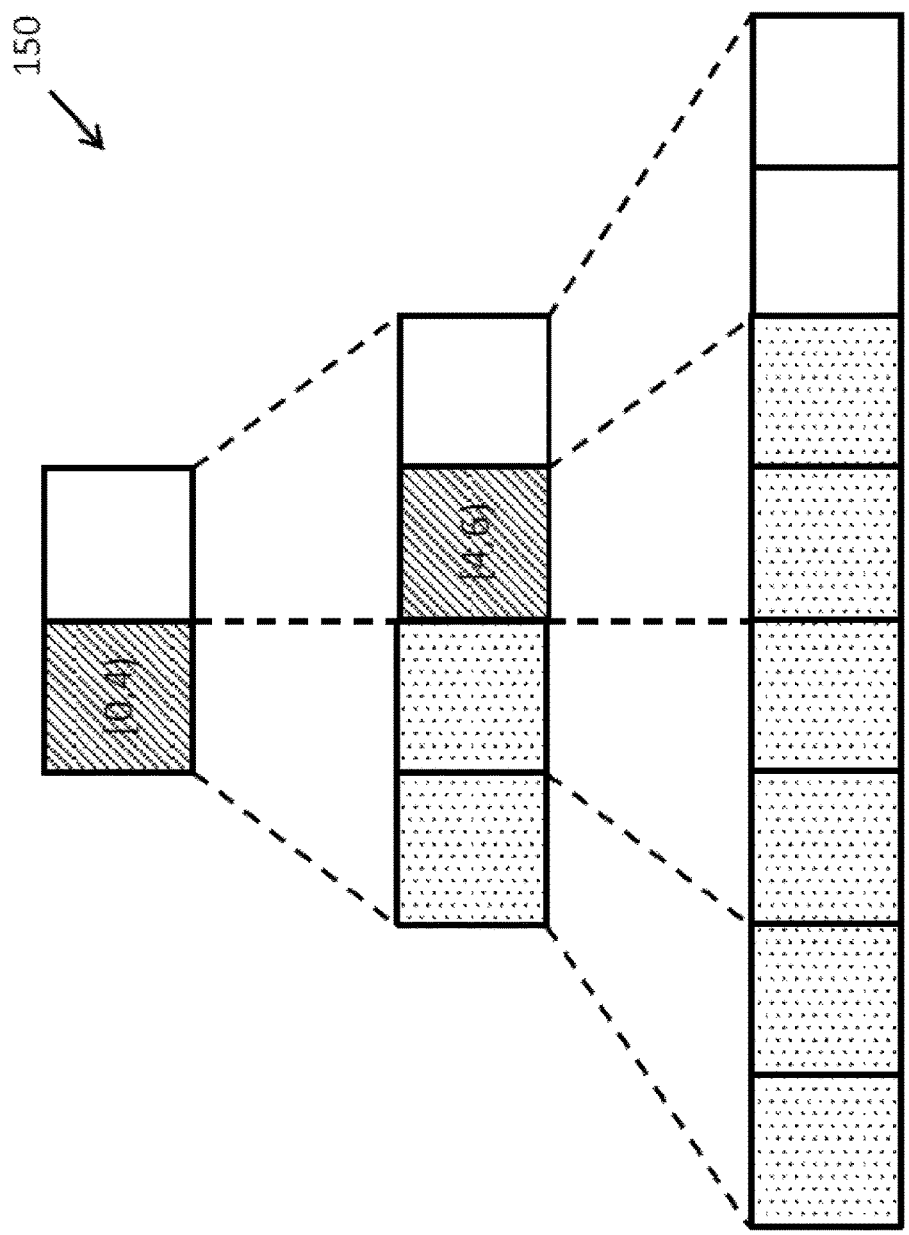
FIG. 10 is a schematic block diagram illustrating one example of the hierarchical data structure at a time T2.
Figure 11:
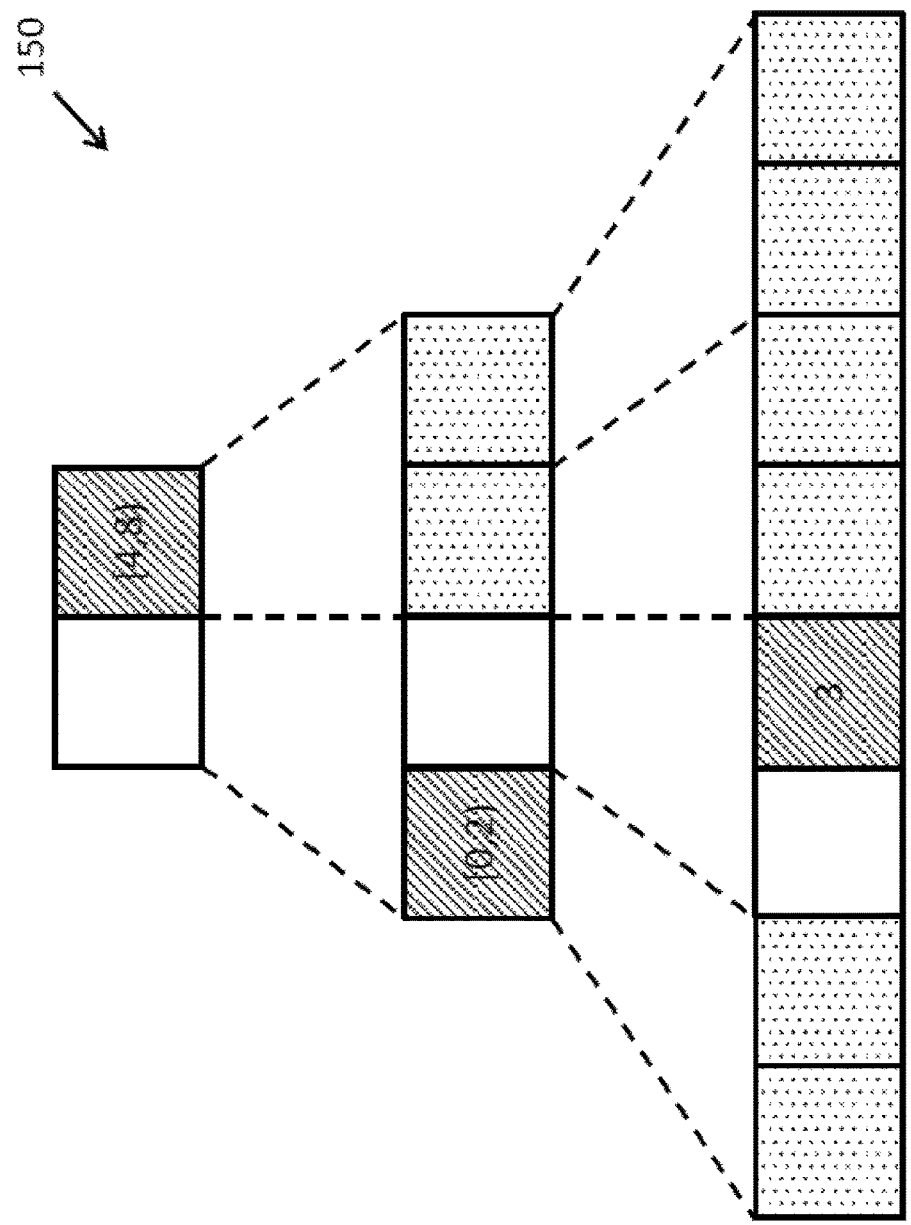
FIG. 11 is a schematic block diagram illustrating one example of the hierarchical data structure at a time T3.

FIG. 7 illustrates an example of the hierarchical data structure 150 at a time T0. FIGS. 8 and 9 illustrate various examples of the operations of the hierarchical data structure 150 at a time T1. Further, FIGS. 10 and 11 illustrate various alternative examples of the operations of the hierarchical data structure 150 at times T2 and T3, respectively, that occur subsequent to the time T2 in the example illustrated in FIG. 9. The examples in FIGS. 7-11 are provided for instructional purposes and/or for ease in understanding the various embodiments of the hierarchical data structure 150 and are not intended to limit the scope of the technology disclosed herein in any manner.

The length (which is equal to the alignment) at a level k may be referred to as the accumulative scaling factor and may be represented as $F_A[k]$. Here, if A[k][i] is true, it will represent a logical address range $[i*F_A[k]], (i+1)*F_A[k])$, as discussed above. Further, for any level k>0 and element A[k][i], the F[k] elements {A[k−1][i*F[k]] . . . A[k−1][(i+1)*F[k]−1]} at level k−1 may be referred to as children or child elements of element A[k][i], which in turn may be referred to as a parent element at level k. Further, children of the same parent element may be considered sibling elements. Moreover, descendants of any element or logical address range may include its child elements and their descendants. For instance, if Y is a descendant of X, X may be considered an ancestor of Y.

The example of FIG. 7 illustrates the state of the hierarchical data structure 150 at time T0. In FIG. 7, the logical address range [0,4) at level L2 of the hierarchical data structure 150 includes hashed lines, which indicates that this logical address range (e.g., logical addresses 0-3) is valid. A valid logical address range indicates that the adjacent physical addresses corresponding to the logical addresses in the element [0,4) currently store continuous and/or related data. Here, the logical address range [0,4) may be considered a parent element and an ancestor element because it includes two children or child elements, each of which includes a respective pair of child elements (e.g., descendant elements of the logical address range [0,4)), as indicated by the dashed lines between levels L2 and L1 and between levels L1 and L0.

The child elements and descendent elements of the logical address range [0,4) are dotted, which indicates that these elements are shadowed by their parent element in the case of the logical address range [0,2) and [2,4) and by their ancestor element in the case of the logical addresses 0-3. A logical address or logical address range that is shadowed indicates that each logical address included therein is part of a larger logical address range or a logical address range with a greater quantity of logical addresses at a higher level in the hierarchical data structure 150. In other words, if A[k][i]=TRUE, the value of all of the descendants of A[k][i] is equal to FALSE since a valid ancestor shadows all of its descendants. Further, a valid or TRUE element may describe the highest level in which a group or range of logical addresses represent a group or range of adjacent physical addresses currently storing continuous and/or related data.

The logical address range [6,8) also includes hashed lines, which indicates that this logical address range is valid. As such, the child elements (e.g., individual logical addresses 6 and 7) are shadowed by their parent element in the case of the logical address range [6,8) to indicate that logical addresses 6 and 7 are grouped together at a higher level (e.g., level L1) in the hierarchical data structure 150.

The logical address 4 includes hashed lines at level L0, which indicates that the physical address that corresponds to the logical address 4 does not store continuous and/or related data with the physical addresses that correspond to the logical addresses 3 and 5. The logical address 5 is open (e.g., is blank), which indicates that the physical address that corresponds to the logical address 5 is empty or is unavailable. If, in the future, the physical address that corresponds to the logical address 5 begins to store data that is not continuous and/or related to the data stored in the physical address that correspond to the logical address 4, the logical address 5 would be updated to include hashed lines.

To locate a logical address that corresponds to a physical address, the hierarchical data structure 150 may be searched beginning from the highest level (e.g., level L2) until a block has a value stored for the logical address is identified. An entry or mapping for a logical address may be located in a level by dividing the logical address by the scaling factor for the level, and using the result as an index to locate the associated entry or mapping at that level. If there is not a valid entry for a logical address in the highest level (e.g., level L2), the next highest level may be checked and so on until a valid entry is found. In this manner, the largest mapped logical address range that includes the logical address in the hierarchical data structure 150 may be identified, which may occur at a level that is higher than searching each individual logical address at level L0. Identifying the subject logical address at a higher level than the lowest or base level (e.g., level L0) decreases the amount of time it may take to locate data in the non-volatile memory 120, which allows the system 100 to operate more efficiently. Once the logical address range including the subject logical address is identified, the physical address in the non-volatile memory 120 corresponding to the subject logical address may be read to identify the physical location of the subject data.

The example of FIG. 8 illustrates the state of the hierarchical data structure 150 at time T1. In FIG. 8, the data in the physical address that corresponds to the logical address 6 and/or the data in the physical address that corresponds to the logical address 7 is modified, written to, and/or rewritten such that the data in these physical addresses are no longer continuous and/or related. As shown, the elements/blocks for logical addresses 6 and 7 include hashed lines to indicate that the physical addresses that correspond to the logical addresses 6 and 7 are each storing data and that the data stored therein is not continuous and/or is unrelated to one another.

FIG. 9 illustrates an alternative example of the state of the hierarchical data structure 150 at time T1. In FIG. 9, the data in the logical address 6 and/or logical address 7 is modified, removed/deleted, moved/relocated, the corresponding physical address being unavailable, and/or the corresponding physical addresses 6 and 7 otherwise not storing continuous and/or related data. In this example, the data in the physical address that corresponds to the logical address 7 is deleted or relocated such that the physical address is empty, which is indicated by the open or blank element/block for the logical address 7.

As shown, the element/block for the logical address range [6,8) that was valid at time T0 (e.g., included hashed lines at time T0) is now open or blank to indicate that this logical address range is invalid and/or no longer valid. Further, the element/block that corresponds to the logical address 6 that was shadowed at time T0 (e.g., was dotted) is updated to include hashed lines to indicate that this logical address is valid (e.g., is currently storing data) and the element/block that corresponds to the logical address 7 that was shadowed at time T0 (e.g., was dotted) is updated so that it is open/blank to indicate that it is empty or unavailable. Moreover, because the logical address 6 is valid, it may be known that the physical address that corresponds to the logical address 6 is storing data and that the data is not continuous and/or is unrelated to data stored in one or more adjacent physical addresses (e.g., the physical address/addresses that correspond to logical address 5 and/or 7).

The example of FIG. 10 illustrates the state of the hierarchical data structure 150 at a time T2 that is subsequent to the time T1 in FIG. 9 and in response to data in the physical address that corresponds to the logical address 6 is continuous and/or related to the data in the physical address that corresponds to the logical address 4 and the data in the physical address that corresponds to the logical address 6 is moved/relocated to the physical address that corresponds to the logical address 5. In FIG. 10 the hierarchical data structure 150 is updated to indicate that the logical address range [6,8) is valid, the logical addresses 4 and 5 are shadowed, and the logical address 6 is open/empty.

The example of FIG. 11 illustrates the state of the hierarchical data structure 150 at a time T3. In FIG. 10, the hierarchical data structure 150 is updated in response to data in the physical addresses that correspond to the logical addresses 6 and 7 being written to include data that is continuous and/or related to one another and to the data in the physical addresses that correspond to the logical addresses 4 and 5. Here, because the physical addresses that correspond to the logical addresses 4-7 currently stored continuous and/or related data, their corresponding logical addresses may be group together in the logical address range [4,8) in level 2 of the hierarchical data structure 150.

Further illustrated in FIG. 11, the data in the physical address that corresponds to the logical address 2 is deleted/moved and/or is otherwise no longer storing data that is continuous and/or related to the physical addresses that correspond to the logical addresses 1 and 3. Here, the hierarchical data structure 150 is updated to indicate that the logical address range [0,4) in level L2 is no longer valid (e.g., is open/blank), the logical address range [0,2) in level L1 is valid (e.g., includes hashed lines), the logical address 3 is valid (e.g., includes hashed lines), and the logical address 2 is open/empty (and the logical addresses 0 and 1 remain shadowed).

Figure 12:
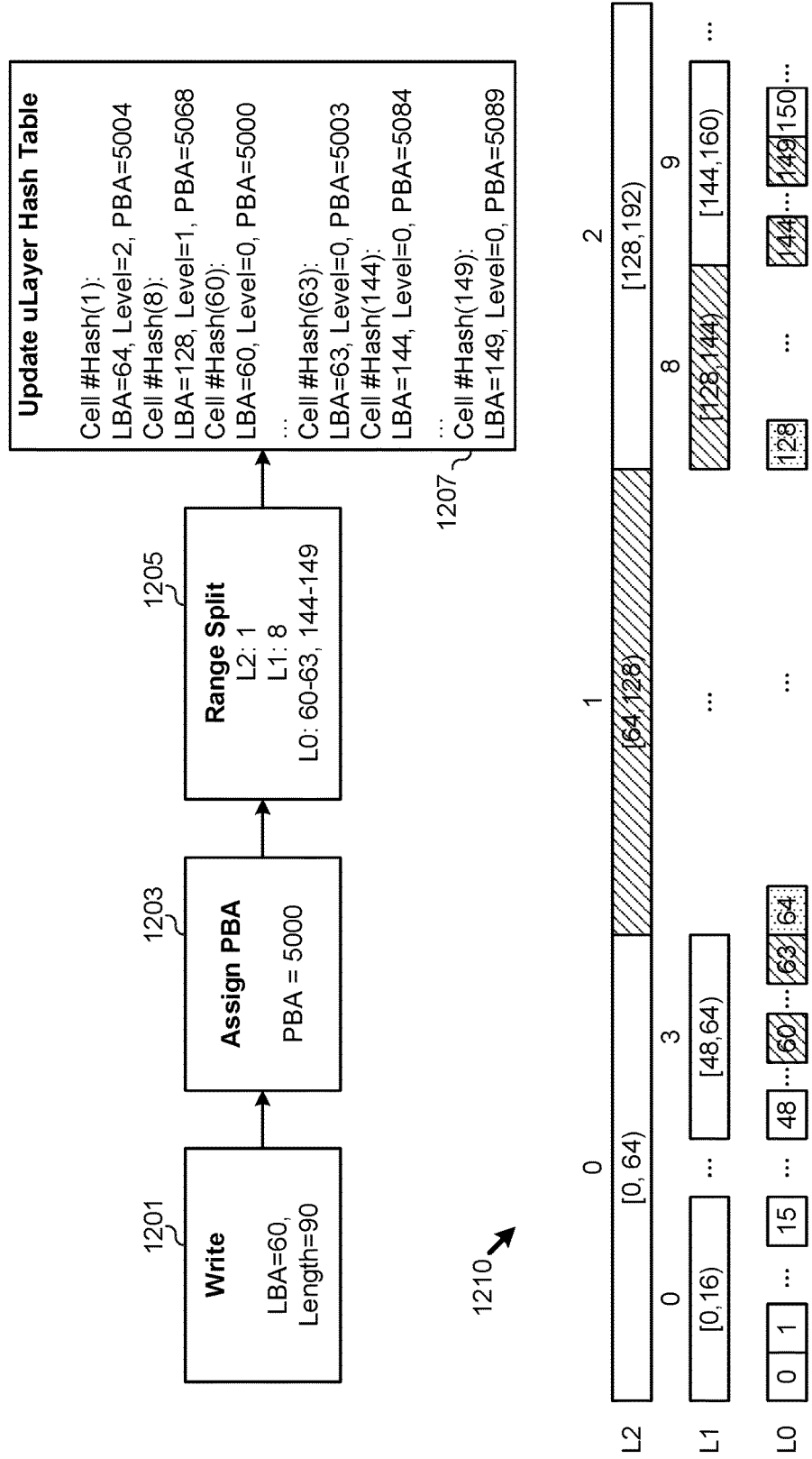
FIG. 12 is a schematic block diagram illustrating one example of mapping data within the hierarchical data structure.

The example of FIG. 12 illustrates the use of a hierarchical data structure 150 when writing data to a hash table, such as an update layer hash table. In a similar manner as described above with regard to FIG. 5, a computing device 110 may attempt to write data at the logical address of 60, where the data has a length of 90 at 1201. Also, in a similar manner to FIG. 5, the computing device 110 may assign a physical address of 5000 to the logical address of 60 at 1203. However, in contrast to calculating and saving a single hash for the logical address and the range of the data, the computing device 110 may split the range into multiple segments at 1205 and calculate separate hashed mappings for the different segments. The computing device 110 may then save the separate hashed mappings within associated portions of the hierarchical data structure.

In certain embodiments, to split the logical address range of the data, the computing device 110 may identify a highest level in the hierarchical data structure 1210. As used herein, the highest level in a hierarchical data structure 1210 may be the level of the hierarchical data structure 1210 with a largest range size that is less than or equal to the logical address range of data that is subject to an I/O request. For example, the hierarchical data structure 1210 may have three levels. In contrast to the hierarchical data structure 150 illustrated in FIGS. 6-11, where the levels have level range sizes of 2, and 4, the levels of the hierarchical data structure 1210 may have level range sizes of 1, 16, and 64. As such, the level L2 of the hierarchical data structure 1210 may have a range size of 64 and logical address ranges of [0,64), [64, 128), [128, 192), . . . , the level L1 of the hierarchical data structure 1210 may have a range size of 16 and logical address ranges of [0, 16), [16, 32), [32, 48), . . . , and the level L0 of the hierarchical data structure 1210 may have a range size of 1 and logical address ranges of 0, 1, 2, . . . . Thus, if the level L1 is the highest level, at least one logical address range for the level may be within the logical address range of the data but no logical address ranges for levels having greater range size may be within the logical address range of the data.

In some embodiments, the computing device 110 may identify an index within the identified highest level of the hierarchical data structure 1210 that is associated with a logical address range that is within the logical address range of the data. As the range of the data is 90 beginning at the logical address of 60, the computing device 110 may determine if the highest level has an index that corresponds with the range of the data by identifying the index that is associated with an initial logical address that is greater than or equal to the logical address of the data. For example, the index 0 of level L2 may be associated with the logical address range of [0,64). As the initial logical address associated with the index is less than the initial logical address of the data (60), the data is not mapped to index 0 of level L2. However, the index 1 of level L2 may be associated with the logical address range of [64, 128) and the initial logical address associated with the index is greater than or equal to the initial logical address of the data, thus the data may be mapped to the index 1 of level L2 if the logical address range associated with the index is within the range of the data. As the logical address range associated with index 1 is [64, 128) and the data extends from logical address 60-149, the logical address range associated with the index 1 of level L2 is within the range of the data. Accordingly, a hashed mapping associated with the physical address of 5004 may be saved in the index 1 of level L2. Thus, the portion of the data associated with logical addresses 64-127 may be mapped to the associated physical addresses through the hashed mapping stored at the index 1 of level L2.

In certain embodiments, the data may span multiple indexes of the highest level. Accordingly, the computing device 110 may check to see if the data is greater than a multiple of the range size associated with the highest level. A portion of the data that is greater than the index that corresponds with a highest multiple of the range size associated with the highest level may be a remainder portion of the data. Also, a portion of the data that is smaller than the index that corresponds with the lowest multiple of the range size associated with the highest level may also be a remainder portion of the data.

Further, the computing device 110 may map remainder portions of the data to lower levels when the remainder portions of the data are not large enough to encompass the logical address range of indexes of the highest level of the hierarchical data structure 1210. For example, the computing device 110 may map logical addresses 64-127 of the data encompassing logical address 60-149 to the level L2 and the remainder may include portions of the data that do not map to the highest level. Thus, the computing system may split the data into at least three portions, the remainder portion associated with the logical addresses 60-63, the portion mapped to level L2 that is associated with the logical address 64-127, and the remainder portion associated with the logical addresses 128-149. As the remainder does not map to level L2, because they are smaller than the logical address range of level L2, the remainder mps to levels lower than level L2 in the hierarchical data structure 1210.

With respect to the remainder portion of the data associated with the logical addresses 60-63, the computing device 110 may attempt to map the data to level L1 of the hierarchical data structure 1210 at an index adjacent to an index that is a descendant of the mapped index in level L2. Accordingly, as the indexes 4-7 of level L1 are descendants of the index 1 of level L2, the computing device 110 may attempt to map the portion of the data associated with the logical addresses 60-63 to the index 3 of level L1. However, the logical address range covered by the index 3 of level L1 begins at the logical address 48, which is less than the beginning logical address of the data. Thus, the computing device 110 may be unable to map the portion of the data associated with the logical address 60-64 to an index of the level L1 of the hierarchical data structure 1210. Accordingly, the computing device 110 may map the logical addresses 60-63 to the next lower level in the hierarchical data structure 1210, which is level L0. As illustrated, the different indexes of level L0 have logical address ranges of range size 1. Thus, the computing device 110 may separate the portion of the data associated with the logical addresses 60-63 into four separate portions of range size 1 and then the computing device 110 may map each portion to an index in level L0 that corresponds with the logical address of the data by calculating a hashed mapping for each of the indexes 60-63 for level L0.

With respect to the remainder portion of the data associated with the logical addresses 128-149, the computing device 110 may attempt to map the data to the level L1 of the hierarchical data structure 1210 at an index adjacent to an index that is also a descendant of the mapped index in level L2. Accordingly, as the indexes 4-7 of level L1 are descendants of the index 1 of level L2, the computing device 110 may attempt to map the portion of the data associated with the logical addresses 128-149 to the index 8 of level L1. As the beginning logical address of the logical address range covered by the index 8 of level L1 is equal to the beginning logical address of the portion of the data associated with the logical addresses 128-149 and the logical address range of the index is less than the logical address range of the portion of the data, the computing device 110 may map the index 8 of level L1 to the portion of the data associated with the logical addresses 128-143 and split the remainder of the portion into six separate portions of range size 1 for mapping to associated indexes in level L0. Thus, the computing device 110 may calculate hashed mappings for the index 8 of level L1 and indexes 144-149 of level L0.

Accordingly, the computing device 110 may split the range of the data into twelve different portions for mapping to the different levels of the hierarchical data structure 1210. The computing device 110 may then calculate a hashed mapping for each of the separate portions (e.g., based on an index associated with a particular portion, based on a starting logical address of a particular portion, or the like). In certain embodiments, the computing device 110 may calculate the hashed mapping based on one or more of the index of the level of the hierarchical data structure, the initial logical address of the logical address range for the index, the level of the hierarchical data structure 1210, and the physical address associated with the initial logical address, or the like. Because the physical address may not be known when an I/O request for a logical address is received, in certain embodiments, a hash function is performed on an index number and/or a logical address, and the resulting hash value is associated with and/or otherwise mapped to the associated physical address in a level (e.g., a hash table) of the hierarchical data structure 1210, so that the computing device 110 may later lookup the physical address using the index and/or the logical address in response to receiving an I/O request. Thus, in calculating the twelve separate mappings for the range of the data, the computing device 110 may calculate hashed mappings to be stored in the index 1 of level L2, index 8 of level L1, indexes 60-63 of level L0, and indexes 144-149 of level L0. When the mappings are calculated, the computing device 110 updates the update layer hash table with the hashed mappings at 1207.

Figure 13:
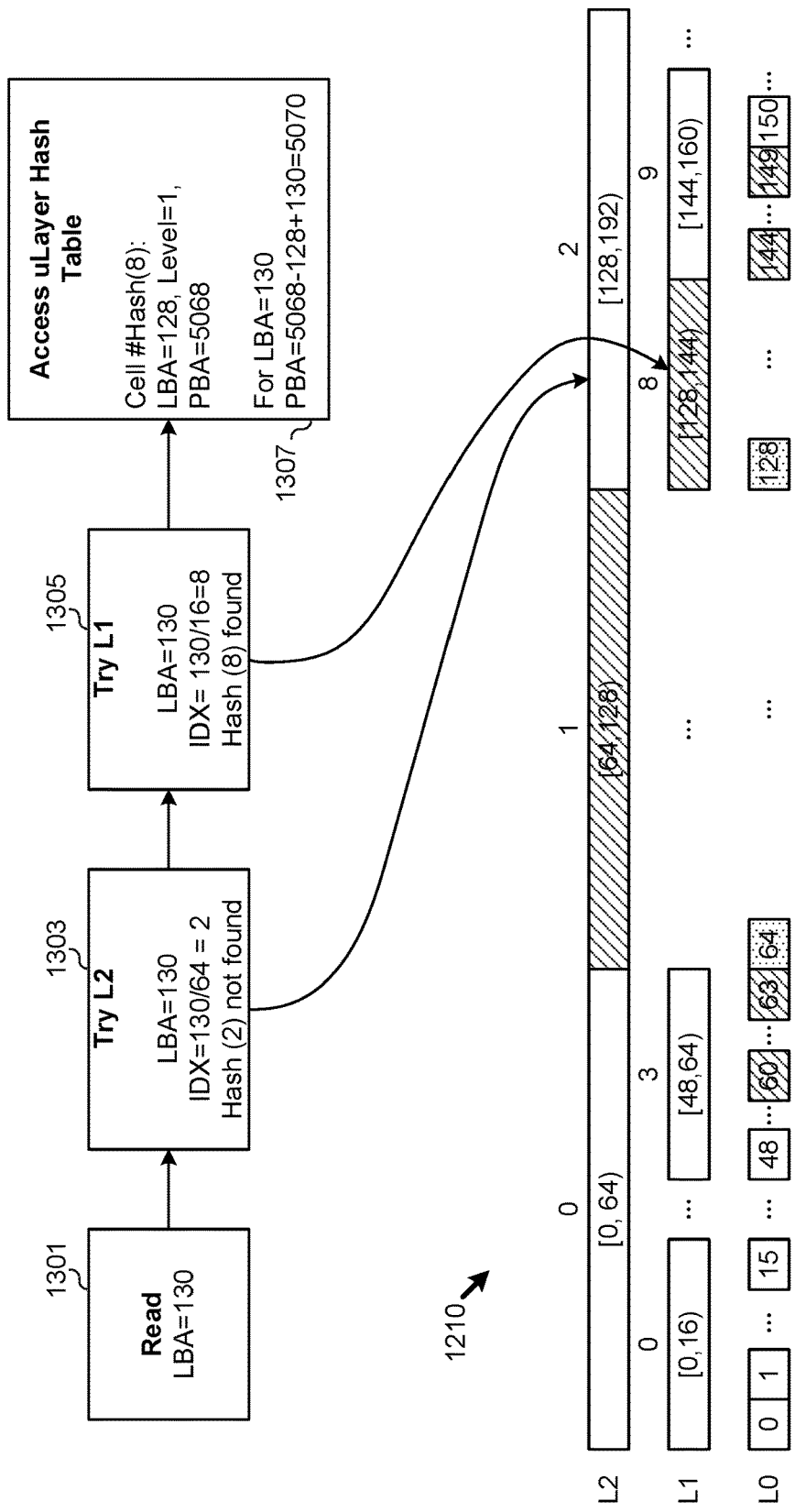
FIG. 13 is a schematic block diagram illustrating one example of identifying mappings within the hierarchical data structure.

As described above with regards to FIG. 5, storing hashed mappings of logical address ranges in a data structure can cause difficulties to arise when searching for a particular mappings within the data structure, such that some attempts to identify mappings within the data structure can fail. By storing the hashed mappings within a hierarchical data structure 1210, an attempt to read logical to physical mappings will be able to acquire the desired mapping. For example, FIG. 13 illustrates the acquisition of a physical address mapping for a logical address from a hierarchical data structure 1210. As illustrated, the computing device 110 may attempt to read the logical address 130 at 1201 in the hierarchical data structure 1210.

In certain embodiments, to find the physical mapping of a logical address, the computing device 110 may attempt to find the largest mapped range in the hierarchical data structure 1210. As used herein, the largest mapped range is the range of a highest level in the hierarchical data structure 1210 that maps a portion of the sought after logical address to the associated physical address. If the computing device 110 fails to find the physical mapping in the highest level, the computing device 110 may attempt to find the physical mapping in progressively lower levels until the computing system finds a hashed mapping at an index associated with the logical address. For example, the computing device 110 may attempt to find the desired hashed mapping in level L2 at 1203. To determine whether a hashed mapping exists in the level L2, the computing device 110 may divide the sought after logical address by the level range size and round the result down to the nearest integer. In particular, the computing device 110 may divide the logical address 130 by the level range size 64, which results in the index 2. The computing device 110 may then check if there is a hashed mapping stored at the index 2 for level L2. The computing device 110 may then determine that the hierarchical data structure 1210 does not store a hashed mapping at the index 2 for level L2.

After checking for the hashed mapping in level L2, the computing device 110 may then attempt to find the hashed mapping in the next highest level, level L1 at 1205. To check for the hashed mapping in the next highest level, level L1, the computing device 110 may divide the logical address by the level range size and round the result down to the nearest integer. In particular, the computing device 110 may divide the logical address 130 by the level range size of 16, which results in the index 8. The computing device 110 may then check if there is a hashed mapping stored at the index 8 for level L1 and determine that the hierarchical data structure 1210 stores a hashed mapping at the index 8 for level L1, which hashed mapping is associated with the logical address to be read.

When the computing device 110 identifies the hashed mapping associated with the logical address to be read, the computing device 110 may then access the update layer hash table to determine the physical address associated with the logical address at 1207. For example, the computing device 110 may identify the hashed logical address and use the identified hashed logical address to determine the associated physical address. As used herein, a hashed logical address is the logical address used to calculate a hash value associated with a hashed mapping (e.g., either by being hashed directly, by being used to determine an index which is hashed, or the like). In particular, the computing device 110 may determine that the lowest logical address associated with the hashed mapping is the hashed logical address 128 and that the logical address 128 is associated with the physical address 5068. The computing device 110 may then identify the difference from the logical address to be read and the hashed logical address associated with the hashed mapping and add the difference to the physical address associated with the hashed mapping to determine the physical address associated with the logical address to be read. For example, if the difference between the logical addresses is two and the hashed logical address is mapped to a physical address of 5068, the physical address to be read may be 5070 or 2+5068. When the computing device 110 has determined the physical address, the computing device 110 may read the desired data stored at the physical address.

In certain embodiments, information about mappings between logical and physical addresses may be stored in the highest level associated with the range of the data as described above with respect to FIG. 12. However, in contrast to FIG. 12, where data that is not associated with the highest level is associated with lower levels, data that does not map directly to an index of the highest level may be defined in tails associated with the one or more indexes of the highest level. For example, as described above with respect to FIG. 12, the data beginning at logical address 60 having a length 90 mapped to index 1 of level L2. Additionally, the portions of the data that did not map to index 1 were mapped to lower levels of the hierarchical data structure. In contrast to mapping portions that fail to map to a highest level to a lower level of the hierarchical data structure, the portions that fail to map to a highest level may be defined as tails of the portion that maps to the highest level of the hierarchical data tree.

Figure 14:
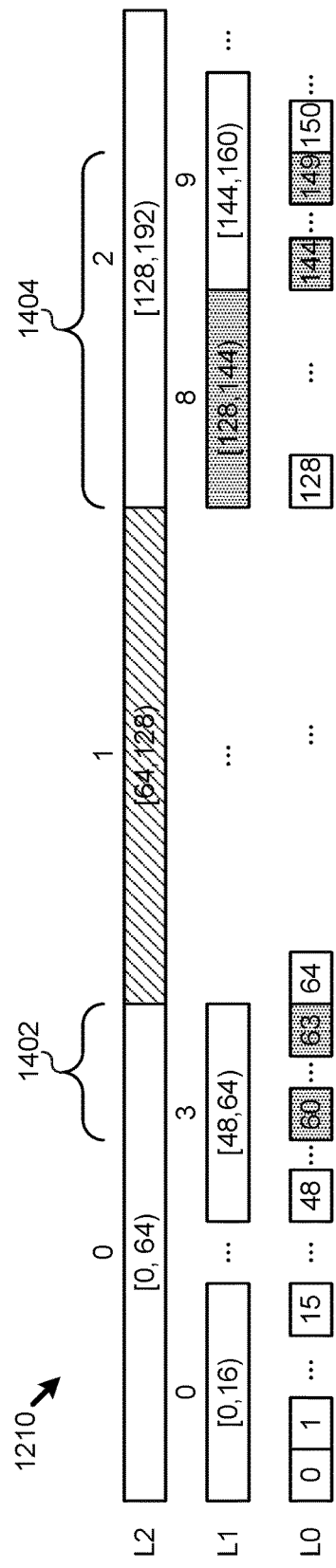
FIG. 14 is a schematic block diagram illustrating one example of storing data within the hierarchical data structure.

FIG. 14 illustrates a hierarchical data structure 1210 where remainder portions of the data that fail to map to a highest level are mapped to tails that are associated with the portion that maps to the highest level. For example, the data beginning at logical address 60 having a length 90 may be mapped to the hierarchical data structure 1210 at a highest level L2. The remainder that do not map to the highest level L2, specifically, a lower remainder that includes the logical addresses 60-63 and an upper remainder that includes the logical addresses 126-149 may be respectively defined as a lower tail 1402 and an upper tail 1404. The portions of the lower levels associated with the data range included in the lower tail 1402 and the upper tail 1404 would not have hashed mappings stored therein. By storing information in the lower tail 1402 and the upper tail 1404, the number of cells used to store information in the hierarchical data structure 1210 may be reduced.

When reading information from a hierarchical data structure 1210 where information is stored in tails as described above, reading information may take more time because the computing device 110 would check tail fields of neighboring lower and upper indexes if a mapping for a logical address is not found in a particular level of the hierarchical data structure 1210. For example, if the computing device 110 looks up the mapping for 130, the computing system will identify the associated index of 2 in the level L2 and determine that the level L2 does not store a mapping associated with the particular address. In contrast to checking the lower levels for mappings, the computing device 110 may check the lower and upper tails of the neighboring indexes 1 and 3. When the neighboring index 1 is checked, the computing device 110 may determine that the upper tail field covers the address 130 and the physical address associated with the logical address 130 may be determined from the tail information associated with the hashed mapping stored in index 1 of level L2.

Figure 15:
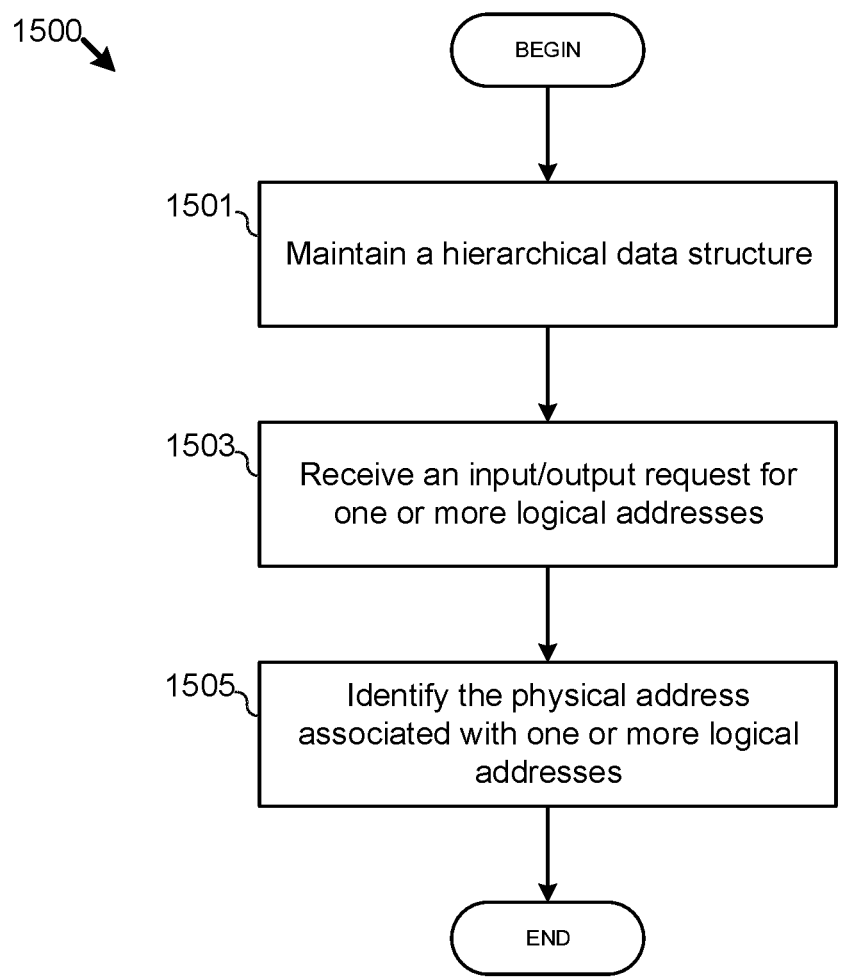
FIG. 15 is a schematic flow chart diagram illustrating one embodiment of a method of address range mapping for storage devices.

With reference to FIG. 15, FIG. 15 is a schematic flow chart diagram illustrating one embodiment of a method 1500 for address range mapping for storage devices. At least in the illustrated embodiment, method 1500 begins at 1501, where a hierarchical data structure 150 is maintained. For example, a processing device may maintain a hierarchical data structure 150 that may include one or more of the embodiments of the hierarchical data structure 150 including multiple levels, as discussed elsewhere herein.

In some embodiments, the method 1500 may proceed at 1503, where an input/output request is received for one or more logical addresses. For example, a processing device may receive a read request to access a memory device at a particular logical address. Alternatively, a processing device may receive a write request to store data at a particular logical address on a memory device.

In further embodiments, the method 1500 may proceed at 1505, where a physical address associated with one or more logical addresses is identified. The processing device may identify a level within the hierarchical data structure 150 that is associated with the one or more logical addresses. When the processing device identifies the level, the processing device may identify the physical address associated with the logical address based on a hashed mapping of the logical address, an index for a level of the hierarchical data structure 150, or the like. When the one or more logical addresses are part of a read request, the processing device may acquire the physical address from the hashed mapping stored in the hierarchical data structure 150. Conversely, when the one or more logical addresses are part of a write request, the processing device may store a hashed mapping associated with the logical address and the physical address in the hierarchical data structure 150. Accordingly, mappings between logical addresses and physical addresses may be more quickly acquired by the processing device.

In various embodiments, a means for maintaining a hierarchical data structure 150 may include one or more of a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for maintaining a hierarchical data structure 150 that includes a plurality of levels for mapping logical addresses to a set of physical addresses of a non-volatile memory.

In various embodiments, a means for hashing information to create one or more hashed mappings that are stored in the hierarchical data structure 150 may include one or more of a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for hashing information to create one or more hashed mappings for storage in the hierarchical data structure 150.

In various embodiments, a means for determining a mapping between a logical address and a physical address may include one or more of a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for determining a mapping between a logical address and a physical address.

In various embodiments, a means for identifying a largest mapped range may include one or more of a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for identifying a largest mapped range.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
   a set of non-volatile memory elements accessible using a set of physical addresses; and
   a controller for the set of non-volatile memory elements, the controller configured to:
      maintain a hierarchical data structure for mapping logical addresses to the set of physical addresses, the hierarchical data structure comprising a plurality of levels with hashed mappings of ranges of the logical addresses at range sizes selected based on a relative position of an associated level within the plurality of levels;
      receive an input/output (I/O) request for data of at least one logical address of the logical addresses; and
      satisfy the I/O request using a hashed mapping of the hashed mappings to map the at least one logical address of the I/O request to one or more of the physical addresses, the hashed mapping having a largest available range size for the at least one logical address of the I/O request.

2. The system of claim 1, wherein the hashed mappings are each determined based on a logical address, a range size of the range sizes, and a physical address associated with the logical address.

3. The system of claim 2, wherein the controller is configured to locate the hashed mapping having the largest available range size for the at least one logical address of the I/O request by checking one or more of the plurality of levels of the hierarchical data structure starting at a level with a largest range size and proceeding successively to levels with smaller range sizes until a hashed mapping for a range including the at least one logical address of the I/O request is located.

4. The system of claim 3, wherein the controller is configured to check a level of the plurality of levels by determining whether a physical address entry exists within the level for a hash of an index associated with the at least one logical address of the I/O request.

5. The system of claim 4, wherein the controller is configured to determine the index for the at least one logical address of the I/O request within the level by rounding a division of the logical address by a range size for the level to a nearest integer less than the division.

6. The system of claim 5, wherein the controller is configured to map the at least one logical address of the I/O request to the one of the physical addresses by:
   determining a physical address associated with the hashed mapping having the largest available range size;
   determining a difference between the at least one logical address of the I/O request and the index multiplied by the range size of the hashed mapping having the largest available range size; and
   adding the determined difference to the determined physical address to determine the one of the physical addresses.

7. The system of claim 1, wherein the I/O request comprises a read request and the controller is further configured to read data from the one or more of the physical addresses to satisfy the read request.

8. The system of claim 1, wherein the I/O request comprises a write request and the controller is further configured to:
   invalidate the hashed mapping;
   select a level of the plurality of levels with a range size that is less than or equal to a size of the at least one logical address; and
   store a new hashed mapping for the at least one logical address in the selected level.

9. The system of claim 8, wherein the controller is further configured to store a second hashed mapping for a remainder portion of the at least one logical address in a different level of the plurality of levels with a smaller range size than the range size of the selected level in response to the range size of the level being less than the size of the at least one logical address.

10. The system of claim 8, wherein the controller is further configured to store remainder information that describes a remainder portion of the at least one logical address in the selected level in response to the range size of the level being less than the size of the at least one logical address.

11. The system of claim 1, wherein the hierarchical data structure comprises an update layer mapping the logical addresses of new write requests to the set of physical addresses.

12. An apparatus comprising:
   means for maintaining a hierarchical data structure comprising a plurality of levels for mapping logical addresses to physical addresses of a non-volatile memory, each level of the plurality of levels comprising a hash table with entries comprising physical addresses, different levels of the plurality of levels associated with different sized ranges of the logical addresses; and
   means for hashing an index determined based on a logical address of an input/output (I/O) request and one of the different sized ranges for a level of the plurality of levels to check the level for one of the entries associated with the logical address.

13. The apparatus of claim 12, further comprising means for determining a mapping between a logical address of the logical addresses and a physical address of the physical addresses by identifying a highest level in the plurality of levels that comprises the one of the entries associated with the logical address, the one of the entries comprising the physical address of the physical addresses.

14. The apparatus of claim 13, further comprising means for satisfying the I/O request using the determined mapping.

15. A method comprising:
   determining an index for a logical address of an input/output (I/O) request in a first level of a hierarchical address mapping structure based on the logical address and a range size for the first level of the hierarchical address mapping structure;
   checking the first level for a physical address associated with the index;
   determining a different index for the logical address in a different level of the hierarchical address mapping structure in response to the first level comprising no physical address associated with the index; and
   executing the I/O request using a physical address associated with the different index in the different level.

16. The method of claim 15, wherein the I/O request comprises a read request and executing the I/O request comprises reading data from the physical address associated with the different index in the different level.

17. The method of claim 15, wherein the I/O request comprises a write request and executing the I/O request comprises:
   invalidating data from the physical address associated with the different index in the different level;
   writing data of the write request to a second physical address;
   adding the second physical address to one of the levels of the hierarchical address mapping structure at an index determined based on the logical address and a range size of the one of the levels of the hierarchical address mapping structure.

18. The method of claim 17, further comprising adding a third physical address for the write request to a different one of the levels of the hierarchical address mapping structure in response to a size associated with the write request being larger than the range size of the one of the levels of the hierarchical address mapping structure, a range size of the different one of the levels being smaller than the range size of the one of the levels.

19. The method of claim 15, wherein determining the index comprises rounding a division of the logical address by the range size for the first level to a nearest integer less than the division of the logical address by the range size and determining the different index comprises rounding a division of the logical address by a different range size for the different level to a nearest integer less than the division of the logical address by the different range size.

20. The method of claim 15, wherein executing the I/O request using the physical address associated with the different index in the different level comprises:
   determining a difference between the logical address and a product of the different index multiplied by a different range size of the different level; and
   adding the determined difference to the physical address associated with the different index and using a resulting offset physical address for the I/O request.

* * * * *